United States Patent
Kim et al.

(10) Patent No.: US 10,531,449 B2
(45) Date of Patent: Jan. 7, 2020

(54) METHOD AND APPARATUS FOR PROCESSING SCHEDULING INFORMATION IN MOBILE COMMUNICATION SYSTEM

(71) Applicant: Samsung Electronics Co., Ltd., Suwon-si, Gyeonggi-do (KR)

(72) Inventors: Soeng-hun Kim, Suwon-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 14/692,280

(22) Filed: Apr. 21, 2015

(65) Prior Publication Data

US 2015/0230248 A1 Aug. 13, 2015

Related U.S. Application Data

(63) Continuation of application No. 13/640,246, filed as application No. PCT/KR2011/002429 on Apr. 6, 2011, now Pat. No. 9,042,320.

(30) Foreign Application Priority Data

Apr. 6, 2010 (KR) .................. 10-2010-0031278
May 7, 2010 (KR) .................. 10-2010-0043238
(Continued)

(51) Int. Cl.
*H04W 72/04* (2009.01)
*H04L 5/00* (2006.01)
(Continued)

(52) U.S. Cl.
CPC ......... *H04W 72/0446* (2013.01); *H04L 5/001* (2013.01); *H04L 5/0007* (2013.01);
(Continued)

(58) Field of Classification Search
None
See application file for complete search history.

(56) References Cited

U.S. PATENT DOCUMENTS 8,000,300 B2 8/2011 Ishii et al.
8,934,459 B2 * 1/2015 Marinier ............... H04L 5/001
370/336

(Continued)

FOREIGN PATENT DOCUMENTS

CN 101146354 A 3/2008
CN 101611649 A 12/2009
(Continued)

OTHER PUBLICATIONS

Qualcomm Incorporated; Supporting multiple timing advance groups; 3GPP TSG-RAN WG2 meeting#68bis; R2-100423; Jan. 18-22, 2010; Valencia, Spain.

(Continued)

*Primary Examiner* — Jutai Kao
(74) *Attorney, Agent, or Firm* — Jefferson IP Law, LLP

(57) ABSTRACT

A method and an apparatus for processing scheduling information in a terminal into which a plurality of forward carriers and reverse carriers are aggregated are provided. The method includes receiving a control message from a base station, the control message including information on a reverse carrier added by the carrier aggregation, and determining a new buffer state table to be used for reporting the state of buffers to the base station, based on the information included in the control message.

18 Claims, 26 Drawing Sheets

(30) Foreign Application Priority Data

Jun. 29, 2010 (KR) ........................ 10-2010-0062273
Oct. 11, 2010 (KR) ........................ 10-2010-0099013

(51) Int. Cl.
*H04W 56/00* (2009.01)
*H04W 72/12* (2009.01)
*H04W 88/02* (2009.01)

(52) U.S. Cl.
CPC .......... *H04L 5/0053* (2013.01); *H04L 5/0091* (2013.01); *H04W 56/0045* (2013.01); *H04W 72/0406* (2013.01); *H04W 72/1278* (2013.01); *H04W 88/02* (2013.01)

(56) References Cited

U.S. PATENT DOCUMENTS

| | | | |
|---|---|---|---|
| 2006/0221883 A1 | 10/2006 | Damnjanovic et al. | |
| 2007/0058584 A1 | 3/2007 | Sutskover | |
| 2008/0064386 A1 | 3/2008 | Nibe | |
| 2008/0151797 A1 | 6/2008 | Camp | |
| 2009/0285104 A1 | 11/2009 | Tseng | |
| 2009/0310556 A1 | 12/2009 | Ishii et al. | |
| 2010/0008236 A1* | 1/2010 | Zhang | H04W 72/1284 370/241 |
| 2010/0118720 A1* | 5/2010 | Gauvreau | H04W 72/048 370/252 |
| 2010/0238857 A1* | 9/2010 | Zhang | H04L 27/2601 370/328 |
| 2010/0254329 A1* | 10/2010 | Pan | H04L 5/001 370/329 |
| 2010/0265896 A1 | 10/2010 | Park et al. | |
| 2011/0007719 A1* | 1/2011 | Lee | H04J 3/0682 370/336 |
| 2011/0080838 A1 | 4/2011 | Larsson et al. | |
| 2011/0103331 A1* | 5/2011 | Kuo | H04L 5/001 370/329 |
| 2011/0242972 A1 | 10/2011 | Sebire et al. | |
| 2011/0243111 A1* | 10/2011 | Andgart | H04W 56/0045 370/338 |
| 2012/0063302 A1* | 3/2012 | Damnjanovic | H04W 56/0045 370/228 |
| 2013/0010619 A1* | 1/2013 | Fong | H04W 74/002 370/252 |
| 2014/0293927 A1 | 10/2014 | Chun et al. | |

FOREIGN PATENT DOCUMENTS

| | | |
|---|---|---|
| CN | 101622898 A | 1/2010 |
| EP | 1 351 535 A1 | 10/2003 |
| EP | 2 398 273 A1 | 12/2011 |
| EP | 2 566 274 A1 | 6/2013 |
| JP | 2006-229292 A | 8/2006 |
| JP | 2007-221276 A | 8/2007 |
| JP | 2009-510804 A | 3/2009 |
| JP | 2013-507020 A | 2/2013 |
| KR | 10-2008-0111407 A | 12/2008 |
| KR | 10-2009-0028443 A | 3/2009 |
| KR | 10-2009-0120403 A | 11/2009 |
| WO | 2009/075549 A1 | 6/2009 |
| WO | 2011/039214 A2 | 4/2011 |

OTHER PUBLICATIONS

ZTE; Impact analysis of multiple TA; 3GPP TSG RAN WG2 meeting#69; R2-101091; Feb. 22-26, 2010; San Francisco, CA.
E-Mail Rapporteur (NTT DOCOMO, INC.); CA support for multi-TA; 3GPP TSG-RAN2#69; R2-101567; Feb. 22-26, 2010; San Francisco, CA.
Anna Larmo et al., "The LTE Link-Layer Design", IEEE Communications Magazine, LTE Part II: 3GPP Release 8, vol. 47, No. 4, pp. 52-59, Apr. 2009.
Robert Mullner et al., "Contrasting Open-Loop and Closed-Loop Power Control Performance in UTRAN LTE Uplink by UE Trace Analysis", IEEE ICC, pp. 1-6, Jun. 2009.
ZTE, Considerations on scheduling in carrier aggregation, 3GPP TSG RAN WG2 Meeting #66bis R2-093886, Jun. 29-Jul. 3, 2009, Los Angeles, CA.
Samsung, MAC header format for LTE-A, 3GPP TSG RAN WG2#67 R2-094857, Aug. 24-28, 2009, Shenzhen, China.
Guangxiang Yuan et al., "Carrier Aggregation for LTE-Advanced Mobile Communication Systems", IEEE Communications Magazine, LTE Technology Update, vol. 48, No. 2, pp. 88-93, Feb. 2010.
3GPP TSG-RAN WG2 Meeting #69bis; "BSR for Carrier Aggregation", R2-102164; Apr. 12-16, 2010; Beijing, China.
Samsung, On BSR for REL-10, 3GPP TSG-RAN2#69bis meeting Tdoc R2-102459, Apr. 12-16, 2010.
3GPP TSG-RAN WG2 Meeting #70bis; "Details of BSR Handling for CA"; Tdoc R2-103569; Jun. 28-Jul. 2, 2010; Stockholm, Sweden.
R2-085617, "On optimizing BS tables", 3GPP TSG-RAN2#63bis meeting; Prague, The Czech Republic; Sep. 29, 2008.
3GPP TS 36.321 V8.8.0; Dec. 2009.
R1-100846, On remaining details for uplink power control with carrier aggregation, 3GPP TSG-RAN WG1#60; Feb. 26, 2010.
R1-101101, Research in Motion UK Limited, PH reporting for Carrier Aggregation, 3GPP TSG-RAN WG1#60; San Francisco, USA; Feb. 22, 2010.
R1-101421, Power headroom reporting for LTE-Advanced, 3GPP TSG-RAN WG1#60; San Francisco, USA; Feb. 22, 2010.
European Office Action dated Oct. 23, 2018, issued in European Patent Application No. 18197198.

* cited by examiner

METHOD AND APPARATUS FOR PROCESSING SCHEDULING INFORMATION IN MOBILE COMMUNICATION SYSTEM

PRIORITY

This application is a continuation application of a prior application Ser. No. 13/640,246, filed on Oct. 9, 2012, which claimed a National Stage application under 35 U.S.C. § 371 of an International application filed on Apr. 6, 2011 and assigned application No. PCT/KR2011/002429, and claims the benefit under 35 U.S.C. § 365(b) of a Korean patent application filed on Apr. 6, 2010 in the Korean Intellectual Property Office and assigned Serial No. 10-2010-0031278, a Korean patent application filed on May 7, 2010 in the Korean Intellectual Property Office and assigned Serial No. 10-2010-0043238, a Korean patent application filed on Jun. 29, 2010 in the Korean Intellectual Property Office and assigned Serial No. 10-2010-0062273, and a Korean patent application filed on Oct. 11, 2010 in the Korean Intellectual Property Office and assigned Serial No. 10-2010-0099013, the entire disclosure of each of which is hereby incorporated by reference.

BACKGROUND OF THE INVENTION

1. Field of the Invention

The present invention relates to efficiently handling scheduling information in a mobile communication system. More particularly, the present invention relates to a method and an apparatus for handling scheduling information by a User Equipment (UE) for which a plurality of downlink carriers and uplink carriers are aggregated, in a mobile communication system.

2. Description of the Related Art

Generally, mobile communication systems have been developed for the purpose of providing communications while ensuring the mobility of users. Thanks to the rapid development of technology, these mobile communication systems have evolved to provide high-speed data communication services as well as voice communication services.

Recently, as one of the next-generation mobile communication systems, Long Term Evolution (LTE) has been standardized in the $3^{rd}$ Generation Partnership Project (3GPP). LTE is technology that can implement high-speed packed-based communication having a data rate of a maximum of about 100 Mbps, which is higher than the currently available data rate, aiming at its commercialization around 2010, and its standardization has almost been completed. On the occasion of the completion of the LTE standardization, LTE-Advanced (LTE-A) systems have recently been discussed in earnest, which may further improve the data rate by combining several new technologies with the LTE communication systems. The term 'LTE system' as used herein may be construed to include the legacy LTE systems and the LTE-A systems. The typical one of the technologies to be newly introduced may include Carrier Aggregation (CA). In Carrier Aggregation, User Equipments (UEs) may transmit and receive data using a plurality of carriers. More specifically, a UE transmits and receives data over predefined cells (commonly, cells belonging to the same Evolved Node B (ENB)) having aggregated carriers, which is substantially the same as the UE transmitting and receiving data over a plurality of cells. Carrier aggregation includes a procedure in which an ENB transfers information about carriers to be aggregated, to UEs (this is called 'carrier setting'), and activates the set carriers at an appropriate time in the future.

The reason for using the dual procedure—carrier setting and carrier activation—is to minimize the battery consumption of UEs by driving only the transceiver for activated carriers instead of always driving transceivers for all carriers aggregated for the UEs.

Generally, in LTE systems, UEs transfer their scheduling information to an ENB, for uplink scheduling. The scheduling information may include Buffer Status Report (BSR) and Power Headroom Report (PHR).

However, in a case of a UE for which a plurality of carriers are set by the carrier aggregation, its theoretical maximum uplink data rate tends to increase in proportion to the number of set carriers. Thus, if the UE reports its buffer status in the manner of the related art, it may suffer from several inefficiencies. In addition, since the channel properties of set uplink carriers may be different depending on the frequency band of uplink carriers, reporting power headroom in the manner of the related art may cause several inefficiencies.

Therefore, a need exists for a method and an apparatus for handling scheduling information by a UE for which a plurality of downlink carriers and uplink carriers are aggregated, in a mobile communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention provides a method and an apparatus for efficiently handling scheduling information in a mobile communication system, and a system thereof.

An aspect of the present invention is to provide a method and an apparatus for efficiently handling scheduling information between a User Equipment (UE) and an Evolved Node B (ENB) in a mobile communication system supporting carrier aggregation, and a system thereof.

Another aspect of the present invention is to provide a method and an apparatus for efficiently performing buffer status reporting by a UE in a mobile communication system supporting carrier aggregation, and a system thereof.

Yet another aspect of the present invention is to provide a method and an apparatus for efficiently performing power headroom reporting by a UE in a mobile communication system supporting carrier aggregation, and a system thereof.

In accordance with an aspect of the present invention, a method for handling scheduling information by a UE in a mobile communication system supporting carrier aggregation is provided. The method includes receiving, from an ENB, a control message including information about an uplink carrier added by the carrier aggregation, and determining a new buffer status table to be used for a buffer status report to the ENB, based on the information included in the control message.

In accordance with another aspect of the present invention, a method for handling scheduling information by a UE in a mobile communication system supporting carrier aggregation is provided. The method includes receiving a control message indicating uplink carrier setting from an ENB and determining a buffer status table to be newly used, and if a Buffer Status Report (BSR) is triggered, generating a Medium Access Control (MAC) Packet Data Unit (PDU) including an identifier of the determined buffer status table and the BSR, and transmitting the MAC PDU to the ENB.

In accordance with another aspect of the present invention, a method for handling scheduling information by a UE in a mobile communication system supporting carrier aggregation is provided. The method includes receiving an uplink grant indicating new transmission for a subframe from an ENB, and receiving a control channel from an associated downlink carriers, and if a BSR is triggered, determining a format and a buffer status value of the BSR.

In accordance with another aspect of the present invention, a method for handling scheduling information by a UE in a mobile communication system supporting carrier aggregation is provided. The method includes, after receiving an uplink grant, determining whether a data channel Power Headroom Report (PHR) for an uplink carrier is triggered, and if the data channel PHR is triggered and the uplink carrier is a Primary Component Carrier (PCC), generating a control channel PHR depending on whether the control channel PHR is configured, and transmitting the control channel PHR to an ENB.

In accordance with another aspect of the present invention, a method for handling scheduling information by a UE in a mobile communication system supporting carrier aggregation is provided. The method includes receiving an allocated uplink resource for new transmission from an ENB, and if the uplink resource for new transmission is uplink resource that is first allocated after a MAC reset, driving a periodic PHR timer for uplink carriers for which the periodic PHR timer is set.

In accordance with another aspect of the present invention, a method for handling scheduling information by a UE in a mobile communication system supporting carrier aggregation is provided. The method includes receiving a parameter for a trigger of a BSR from an ENB to activate the trigger, determining whether a buffer status value of the triggered BSR satisfies a reference buffer status value, and if the buffer status value satisfies the reference buffer status value, applying a predefined reference trigger.

In accordance with another aspect of the present invention, a method for handling scheduling information by a UE in a mobile communication system supporting carrier aggregation is provided. The method includes determining whether power scaling occurs during uplink transmission, and if power scaling occurs, triggering a PHR of uplink carriers for which a PHR is configured, among the uplink carriers associated with uplink transmission during which the power scaling has occurred.

In accordance with another aspect of the present invention, a method for handling scheduling information by a UE in a mobile communication system supporting carrier aggregation is provided. The method includes receiving a control message including PHR configuration information from an ENB and determining whether a PHR is triggered, and if the PHR is triggered, transmitting a PDU including a PHR for a primary carrier and a PHR for a secondary carrier, to the ENB.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
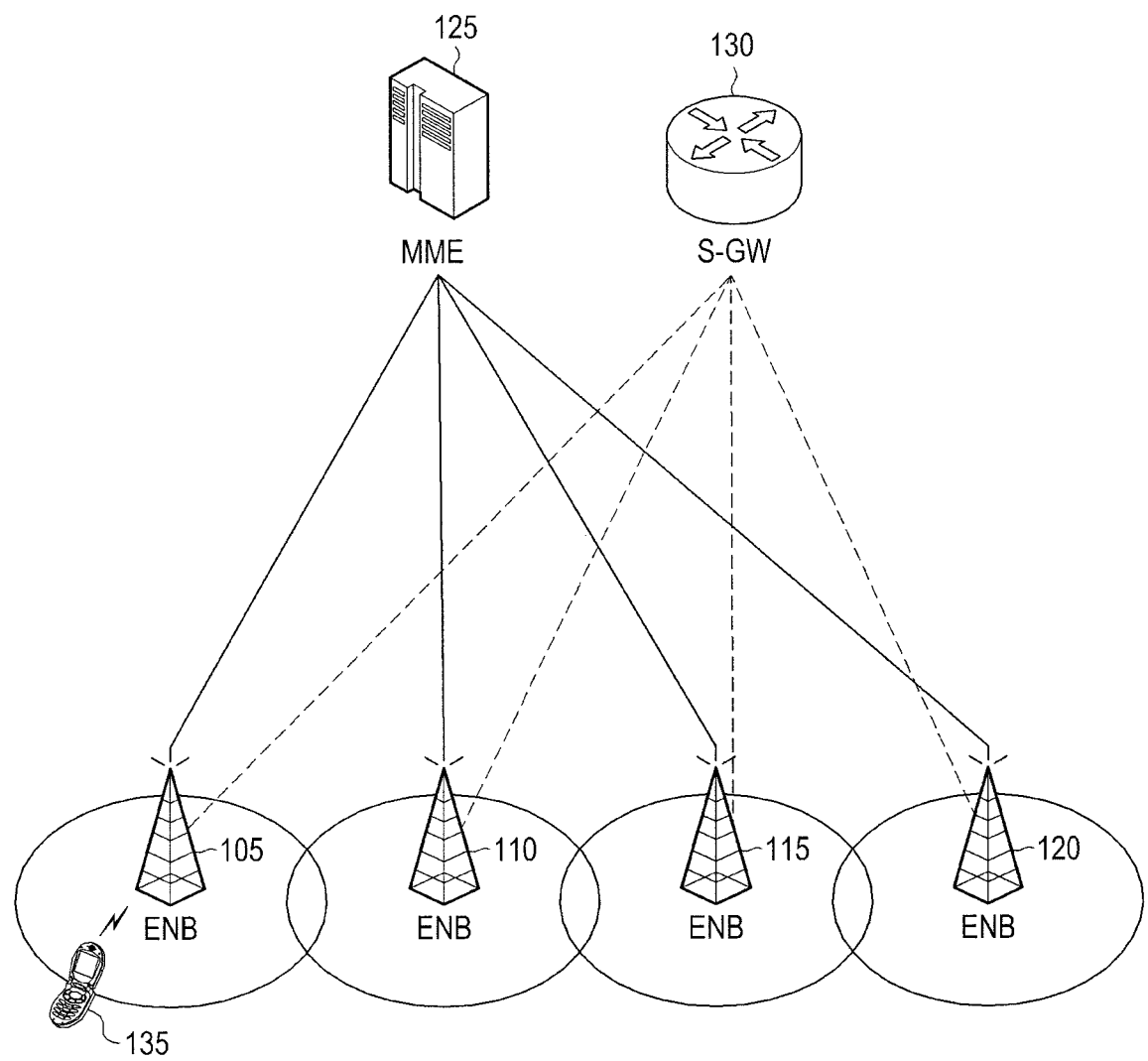
FIG. 1 illustrates an architecture of a Long Term Evolution (LTE) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention relate to a method and an apparatus for performing a Buffer Status Report (BSR) function and a Power Headroom Report (PHR) function by a User Equipment (UE) for which a plurality of carriers are aggregated. Prior to a description of the present invention, a Long Term Evolution (LTE) system will be described with reference to FIGS. 1, 2 and 3.

FIGS. 1 through 30, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates an architecture of an LTE system according to an exemplary embodiment of the present invention.

Referring to FIG. 1, a wireless access network of the LTE system includes Evolved Node Bs (ENBs) (or Node Bs) 105, 110, 115, and 120, a Mobility Management Entity (MME) 125, and a Serving-Gateway (S-GW) 130. A UE 135 may access the external network via the ENBs 105 through 120 and the S-GW 130.

The ENBs 105 through 120 in FIG. 1 correspond to the legacy Node Bs of the UMTS system. The ENBs are connected to the UE 135 over wireless channels, and perform more complex functions than the legacy Node Bs. In the LTE system, since all user traffic, including real-time services, such as Voice over Internet Protocol (VoIP), is serviced over shared channels, a device for performing scheduling by collecting status information, such as UEs' buffer status, power headroom status, and channel status, is needed, and the ENBs 105 through 120 are in charge of the scheduling. One ENB commonly controls a plurality of cells. In order to implement a data rate of, for example, 100 Mbps, the LTE system employs Orthogonal Frequency Division Multiplexing (OFDM) as its wireless access technology in a certain bandwidth, for example, 20 MHz. The LTE system may employ Adaptive Modulation & Coding (AMC) that determines a modulation scheme and a channel coding rate depending on the channel status of UEs. The S-GW 130, a device for providing data bearers, creates and removes data bearers under control of the MME 125. The MME 125 is connected to a plurality of ENBs and is responsible for various control functions including a mobility management function for UEs.

Figure 2:
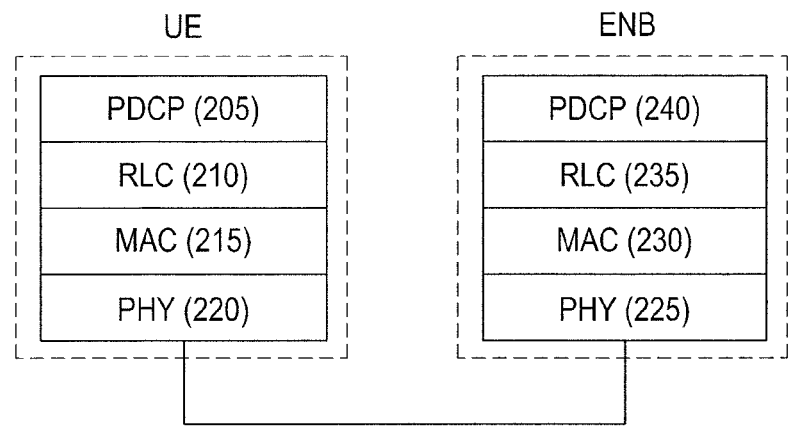
FIG. 2 illustrates a structure of a radio protocol in an LTE system according to an exemplary embodiment of the present invention.

FIG. 2 illustrates a structure of a radio protocol in an LTE system according to an exemplary embodiment of the present invention.

Referring to FIG. 2, the radio protocol for the LTE system includes Packet Data Convergence Protocol (PDCPs) 205 and 240, Radio Link Control (RLCs) 210 and 235, and Medium Access Control (MACs) 215 and 230 in a UE and an ENB, respectively. The PDCPs 205 and 240 are responsible for an operation of compressing/decompressing IP headers, and the RLCs 210 and 235 perform an Automatic Repeat reQuest (ARQ) operation by reconstructing PDCP Packet Data Units (PDUs) in an appropriate size. The MACs 215 and 230, connected to several RLC layer devices configured in one UE, may multiplex RLC PDUs to a MAC PDU and demultiplex RLC PDUs from a MAC PDU. The MACs 215 and 230 are responsible for BSR generation and transmission and PHR generation and transmission. Physical layers 220 and 225 channel-code and modulate upper layer data into OFDM symbols, and transmit them over a wireless channel. The physical layers 220 and 225 demodulate and channel-decode OFDM symbols received over a wireless channel, and transfer them to their upper layers. In terms of transmission, data which is input to protocol entities is called Service Data Units (SDUs), while data which is output from the protocol entities is called Protocol Data Units (PDUs).

Figure 3:
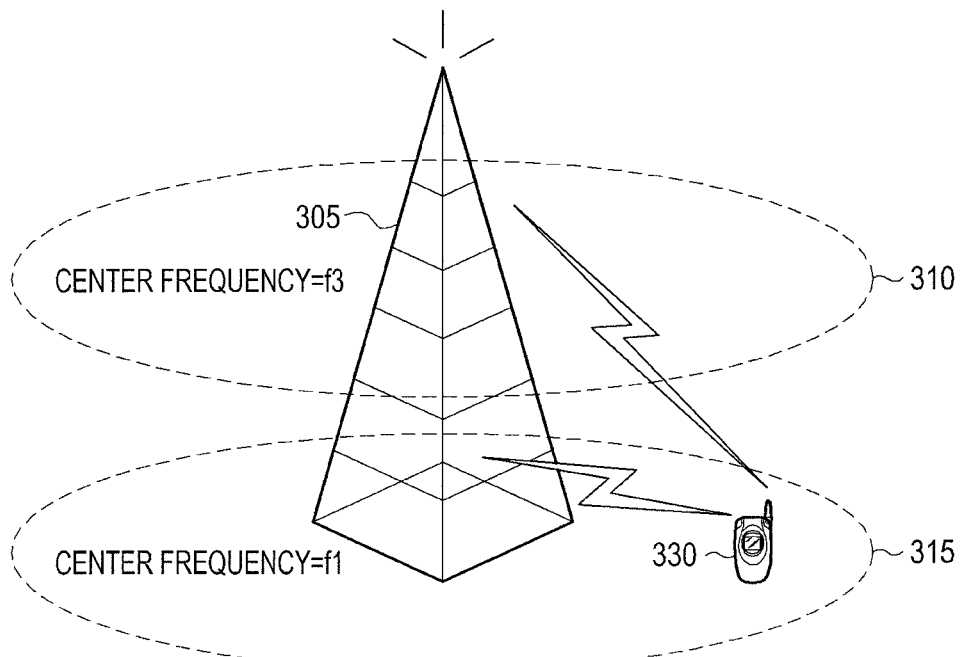
FIG. 3 illustrates carrier aggregation in a User Equipment (UE) according to an exemplary embodiment of the present invention.

FIG. 3 illustrates carrier aggregation in a UE according to an exemplary embodiment of the present invention.

Referring to FIG. 3, in one ENB, a plurality of carriers are transmitted and received over several frequency bands. For example, when a carrier 315 with a center frequency of f1 and a carrier 310 with a center frequency of f3 are transmitted from an ENB 305, one UE of the related art transmits and receives data using one of the two carriers. However, a UE having the carrier aggregation capability may transmit and receive data using several carriers at the same time. The ENB 305 may allocate more carriers to a UE 330 having the carrier aggregation capability depending on the circumstances, thereby increasing the data rate of the UE 330. In the traditional sense, if it is assumed that one downlink carrier and one uplink carrier, which are transmitted and received in one ENB, constitute one cell, the term 'carrier aggregation' may be construed to transmit and receive data by a UE over several cells at the same time. In this way, the maximum data rate may increase in proportion to the number of aggregated carriers. In the following description of exemplary embodiments of the present invention, the phrase 'UE's receiving data over any downlink carrier or transmitting data over any uplink carrier' has the same meaning as transmitting or receiving data using a control channel and a data channel provided by a cell corresponding to the center frequency and frequency band featuring the carrier. Although exemplary embodiments of the present invention will be assumed to be applied to the LTE system, the present invention may be applied to various other wireless communication systems supporting carrier aggregation.

Among the following exemplary embodiments of the present invention, the first through third exemplary embodiments and a seventh exemplary embodiment are for a method of efficiently performing BSR in a scheduling information that a UE transmits to an ENB, and the fourth through sixth exemplary embodiments and the eighth and tenth exemplary embodiments are for a method of efficiently performing PHR in a status information. A ninth exemplary embodiment for the present invention is for a method of changing a primary carrier by a control message. The following exemplary embodiments are all for a method of transmitting scheduling information in carrier aggregation.

First Exemplary Embodiment

A first exemplary embodiment of the present invention provides a method and an apparatus in which a UE selects an appropriate BSR table to report a buffer status. More specifically, in the provided method and apparatus, a UE and an ENB each have a plurality of buffer status tables, and select an appropriate buffer status table taking into account the number of uplink carriers set for the UE, or into another predefined conditions.

A UE triggers a BSR, if predefined conditions are satisfied, and generates and transmits a BSR if uplink transmission is possible. The BSR trigger conditions will be described later. BSR is MAC control information having a predefined format used to report a buffer status of UEs. In brief, the BSR is information indicating the amount of transmittable data for each logical channel group of UEs. A logical channel is a channel created to service data of a predefined upper layer. The logical channel is handled in PDCP layers configured to handle service data, and a transmission buffer may be provided for each logical channel. Generally, one logical channel is set up for each user service, and a priority is given thereto in order to satisfy the required quality of the mapped service. A maximum of 11 logical channels may be set up, and the LTE system reports a buffer status for each logical channel group made by grouping logical channels having similar priorities, instead of individually reporting a buffer status of each of the maximum of 11 logical channels. The amount of transmittable data which is stored for each logical channel group is expressed by 6-bit information indicating a buffer status value. The buffer status value is a value obtained by logarithmically sampling as many values as the number of buffer status values between a predefined minimum value and a predefined maximum value. The maximum value of the buffer status value is a value set for performing seamless transmission, if it is assumed that a BSR delay occurs when a UE transmits data at its maximum data rate. For example, if the UE's maximum data rate is X bps and Y sec is required for BSR transmission, the maximum value of the buffer status value is a product of X and Y. The factors for determining the maximum data rate of a UE may include UE-specific performance or the number of uplink carriers that is set for the UE at a certain time. Among them, the number of set uplink carriers has a huge impact on the maximum data rate of the UE. In a case of given UE performance, if a data rate of Z bps is possible with the use of one uplink carrier, a data rate of Z*N bps is possible with the use of N uplink carriers. In exemplary embodiments of the present invention, a plurality of buffer status tables are defined, and a UE and an ENB perform buffer status reporting using an appropriate buffer status table depending on the maximum number of uplink carriers that the UE can use.

For reference, in the related art, buffer status tables indicating a buffer status between 0 byte and 150000 bytes is used. For convenience of description, the buffer status table of the related art is named a default buffer status table. Table 1 below illustrates the default buffer status table in Section 6.1.3.1 in the December 2009 version of the 3$^{rd}$ Generation Partnership Project (3GPP) Technical Specification TS 36.321. Hereinafter, Specification 36.321 shall be construed to refer to the December 2009 version of the Specification 36.321. Table 1 illustrates an example of the default buffer status table, but in exemplary embodiments of the present invention, the default buffer status table may not be limited to Table 1.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |

TABLE 1-continued

| Index | Buffer Size (BS) value [bytes] |
|---|---|
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

In the first exemplary embodiment of the present invention, a UE and an ENB each have a plurality of buffer status tables, including the default buffer status table illustrated in Table 1. By applying predefined rules, the UE and the ENB determine the buffer status table they will use from among a plurality of buffer status tables at a certain time. The predefined rules may be, for example, the number of uplink carriers which are set at the certain time. The buffer status tables additionally provided in addition to the default buffer status table may be defined to agree with the maximum data rate of the UE. For example, if the number of uplink carriers that can be set for the UE is n, the UE may have a total of n additional buffer status tables, including a buffer status table whose maximum value of the buffer status value is twice that of the default buffer status table, and a buffer status table whose maximum value is three times that of the default buffer status table. Otherwise, the UE may have a limited number of, for example, two or three buffer status tables, instead of having an excessively large number of buffer status tables. For convenience, it is assumed that the UE and the ENB each have three buffer status tables: a default buffer status table, a first buffer status table, and a second buffer status table. The first buffer status table is defined on the assumption that the number of uplink carriers set for the UE is 2, and its maximum buffer report value is 300000 bytes. The second buffer status table is defined on the assumption that the number of uplink carriers set for the UE is 3 or more, and its maximum buffer report value is 1500000 bytes. Examples of the first buffer status table and the second buffer status table are illustrated in Table 2 and Table 3, respectively. In exemplary embodiments of the present invention, the UE is assumed to have a default buffer status table, a first buffer status table, and a second buffer status table. However, each of the UE and the ENB may have the larger number of buffer status tables or the less number of buffer status tables.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 15 |
| 4 | 15 < BS <= 17 |
| 5 | 17 < BS <= 20 |
| 6 | 20 < BS <= 24 |
| 7 | 24 < BS <= 28 |
| 8 | 28 < BS <= 33 |
| 9 | 33 < BS <= 39 |
| 10 | 39 < BS <= 46 |
| 11 | 46 < BS <= 55 |
| 12 | 55 < BS <= 65 |
| 13 | 65 < BS <= 76 |
| 14 | 76 < BS <= 90 |
| 15 | 90 < BS <= 107 |
| 16 | 107 < BS <= 127 |
| 17 | 127 < BS <= 150 |
| 18 | 150 < BS <= 177 |
| 19 | 177 < BS <= 210 |
| 20 | 210 < BS <= 249 |
| 21 | 249 < BS <= 294 |
| 22 | 294 < BS <= 348 |
| 23 | 348 < BS <= 412 |
| 24 | 412 < BS <= 488 |
| 25 | 488 < BS <= 578 |
| 26 | 578 < BS <= 684 |
| 27 | 684 < BS <= 810 |
| 28 | 810 < BS <= 959 |
| 29 | 959 < BS <= 1136 |
| 30 | 1136 < BS <= 1345 |
| 31 | 1345 < BS <= 1592 |
| 32 | 1592 < BS <= 1885 |
| 33 | 1885 < BS <= 2232 |
| 34 | 2232 < BS <= 2643 |
| 35 | 2643 < BS <= 3130 |
| 36 | 3130 < BS <= 3706 |
| 37 | 3706 < BS <= 4388 |
| 38 | 4388 < BS <= 5196 |
| 39 | 5196 < BS <= 6153 |
| 40 | 6153 < BS <= 7285 |
| 41 | 7285 < BS <= 8627 |
| 42 | 8627 < BS <= 10215 |
| 43 | 10215 < BS <= 12096 |
| 44 | 12096 < BS <= 14322 |
| 45 | 14322 < BS <= 16959 |
| 46 | 16959 < BS <= 20082 |
| 47 | 20082 < BS <= 23779 |
| 48 | 23779 < BS <= 28157 |
| 49 | 28157 < BS <= 33342 |
| 50 | 33342 < BS <= 39480 |
| 51 | 39480 < BS <= 46749 |
| 52 | 46749 < BS <= 55357 |
| 53 | 55357 < BS <= 65549 |
| 54 | 65549 < BS <= 77618 |
| 55 | 77618 < BS <= 91908 |
| 56 | 91908 < BS <= 108831 |
| 57 | 108831 < BS <= 128868 |
| 58 | 128868 < BS <= 152595 |
| 59 | 152595 < BS <= 180691 |
| 60 | 180691 < BS <= 213959 |
| 61 | 213959 < BS <= 253353 |
| 62 | 253353 < BS <= 300000 |
| 63 | 300000 < BS |

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 15 |
| 4 | 15 < BS <= 18 |
| 5 | 18 < BS <= 22 |
| 6 | 22 < BS <= 27 |
| 7 | 27 < BS <= 33 |
| 8 | 33 < BS <= 40 |
| 9 | 40 < BS <= 48 |
| 10 | 48 < BS <= 59 |
| 11 | 59 < BS <= 71 |
| 12 | 71 < BS <= 86 |
| 13 | 86 < BS <= 105 |
| 14 | 105 < BS <= 127 |
| 15 | 127 < BS <= 155 |
| 16 | 155 < BS <= 188 |
| 17 | 188 < BS <= 228 |
| 18 | 228 < BS <= 278 |
| 19 | 278 < BS <= 337 |
| 20 | 337 < BS <= 410 |
| 21 | 410 < BS <= 498 |
| 22 | 498 < BS <= 606 |
| 23 | 606 < BS <= 736 |
| 24 | 736 < BS <= 895 |
| 25 | 895 < BS <= 1088 |
| 26 | 1088 < BS <= 1323 |
| 27 | 1323 < BS <= 1608 |
| 28 | 1608 < BS <= 1955 |
| 29 | 1955 < BS <= 2377 |
| 30 | 2377 < BS <= 2890 |
| 31 | 2890 < BS <= 3513 |
| 32 | 3513 < BS <= 4271 |
| 33 | 4271 < BS <= 5192 |
| 34 | 5192 < BS <= 6313 |
| 35 | 6313 < BS <= 7675 |
| 36 | 7675 < BS <= 9331 |
| 37 | 9331 < BS <= 11344 |
| 38 | 11344 < BS <= 13792 |
| 39 | 13792 < BS <= 16767 |
| 40 | 16767 < BS <= 20385 |
| 41 | 20385 < BS <= 24784 |
| 42 | 24784 < BS <= 30131 |
| 43 | 30131 < BS <= 36633 |
| 44 | 36633 < BS <= 44537 |
| 45 | 44537 < BS <= 54147 |
| 46 | 54147 < BS <= 65831 |
| 47 | 65831 < BS <= 80036 |
| 48 | 80036 < BS <= 97306 |
| 49 | 97306 < BS <= 118302 |
| 50 | 118302 < BS <= 143829 |
| 51 | 143829 < BS <= 174863 |
| 52 | 174863 < BS <= 212595 |
| 53 | 212595 < BS <= 258468 |
| 54 | 258468 < BS <= 314239 |
| 55 | 314239 < BS <= 382045 |
| 56 | 382045 < BS <= 464481 |
| 57 | 464481 < BS <= 564705 |
| 58 | 564705 < BS <= 686556 |
| 59 | 686556 < BS <= 834699 |
| 60 | 834699 < BS <= 1014807 |
| 61 | 1014807 < BS <= 1233779 |
| 62 | 1233779 < BS <= 1500000 |
| 63 | 1500000 < BS |

Figure 4:
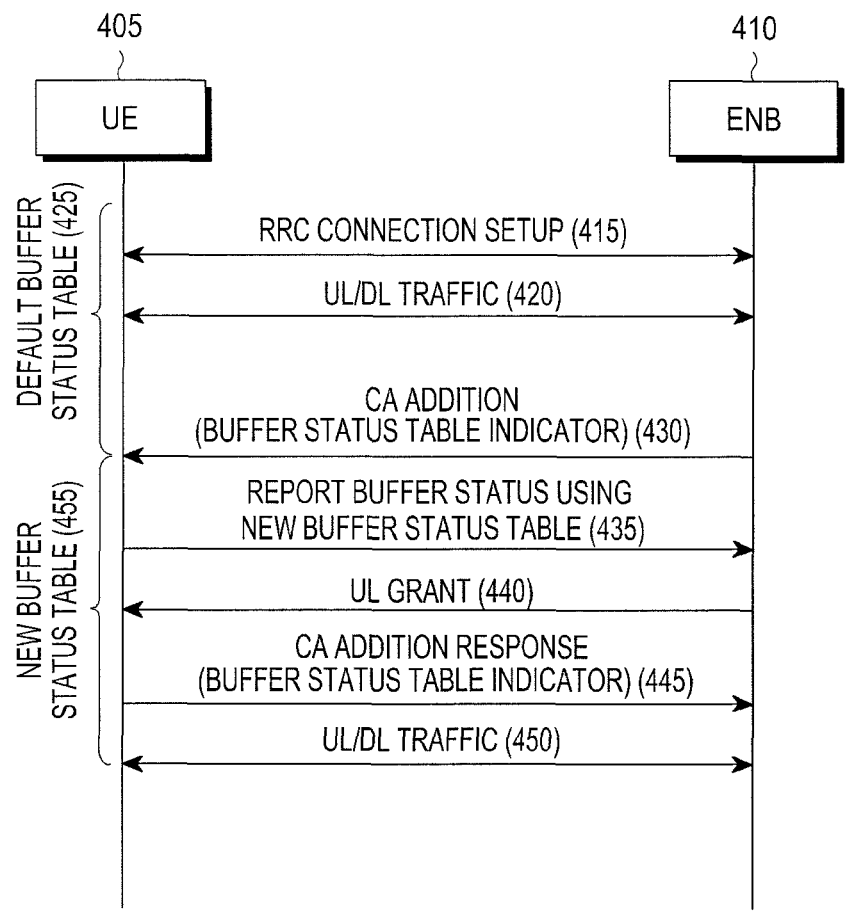
FIG. 4 illustrates a buffer status reporting method according to a first exemplary embodiment of the present invention.

FIG. 4 illustrates a buffer status reporting method according to a first exemplary embodiment of the present invention.

Referring to FIG. 4, after performing a Radio Resource Control (RRC) connection setup process in step 415, a UE 405 performs communication with an ENB 410 using the same method as that of the LTE UE of the related art in step 420 until carriers are additionally allocated. In other words, the UE 405 and the ENB 410 transmit and receive downlink data and uplink data using one downlink carrier and one uplink carrier, like the common LTE UE. In this case, the UE 405 and the ENB 410 use the default buffer status table in step 425, since the number of set uplink carriers is one. Thereafter, in step 430, if the traffic of the UE 405 increases at a certain time, the ENB 410 determines to add a new carrier to the UE 405 (CA Addition). The ENB 410 sends a predefined RRC message to the UE 405 as a control message, and the RRC message includes information related to the newly added uplink carrier, e.g., carrier's center frequency and bandwidth information. Based on the number of the newly added uplink carriers, the UE 405 determines the buffer status table it will use moving forward. For example, if a total of two uplink carriers are set for the UE 405 as one uplink carrier is newly added for the UE 405, the UE 405 uses the first buffer status table. Otherwise, if a total of three uplink carriers are set for the UE 405 as two uplink carriers are newly added for the UE 405, the UE 405 uses the second buffer status table.

In an alternative exemplary embodiment of the present invention, the UE 405 may determine the buffer status table it will use, based on the UE's 405 maximum uplink data rate by the added uplink carrier, instead of the number of uplink carriers which are set for the UE 405. The maximum uplink data rate is a function that is defined based on the factors, such as an uplink bandwidth, the number of transmit antennas, and a modulation scheme. The UE 405 and the ENB 410 may agree in advance to use the default buffer status table if the maximum uplink data rate is less than or equal to X bps, to use the first buffer status table if the maximum uplink data rate is between X bps and Y bps, and to use the second buffer status table if the maximum uplink data rate is greater than or equal to Y bps. The maximum uplink data rate may be calculated for each of the uplink carriers and summed up. The maximum data rate of an arbitrary Uplink Component Carrier x (UL CC x) may be calculated using, for example, Equation 1 below.

$$\text{Maximum data rate of UL CC } x = (BW \text{ of UL CC } x) * (\text{maximum spectral efficiency of UL CC } x).$$

$$\text{The Maximum spectral efficiency of UL CC } x = (\text{maximum modulation order}) * (\text{number of antennas for the UL CC } x). \quad \text{Equation 1}$$

The UE 405 calculates the maximum data rate for each uplink carrier, using a bandwidth of a set uplink carrier, setting/non-setting of MIMO (e.g., the number of antennas to be used in the carrier), and the maximum modulation order, and calculates a sum of the maximum data rates of the uplink carriers by adding up the values calculated for the uplink carriers.

The UE 405 determines the buffer status table it will use moving forward, by determining a buffer status table to which a value of the maximum uplink data rate by the set or added uplink carrier corresponds. The ENB 410 may directly instruct the UE 405 to determine which buffer status table it will use, instead of spontaneously determining by the UE 405 the buffer status table taking the uplink carrier setting situation into account, as described above. The information indicating the buffer status table to be used may be included in a control message (e.g., an RRC message) that is sent in step 430 to newly add a carrier(s). If the UE 405 receives the RRC message and recognizes that a new buffer status table should be used in step 455, it triggers a BSR and transmits the triggered BSR through a predefined procedure in step 435. The reason for triggering the BSR is to remove the uncertainty which may occur during a change in the buffer status table. For example, if the UE 405 transmitted a BSR using the previous buffer status table just before it applies the new buffer status table in step 455, the ENB 410 may not exactly determine whether the BSR is based on a new buffer status table or the previous buffer status table. In order to address this problem, if the buffer status table is changed, the UE 405 triggers a regular BSR and reports its buffer status to the ENB 410 using the changed buffer status table as quickly as possible. In step 440, the ENB 410 allocates an uplink grant to the UE 410 upon successfully receiving the BSR. In step 445, the UE 405 performs uplink transmission using the allocated uplink grant. A message undergoing the uplink transmission in step 445 may be, for example, a response message to the RRC control message that the UE 405 received in step 430. Thereafter, in step 450, the UE 405 and the ENB 410 perform uplink data transmission and reception using the new buffer status table until the buffer status table is newly changed.

Figure 5:
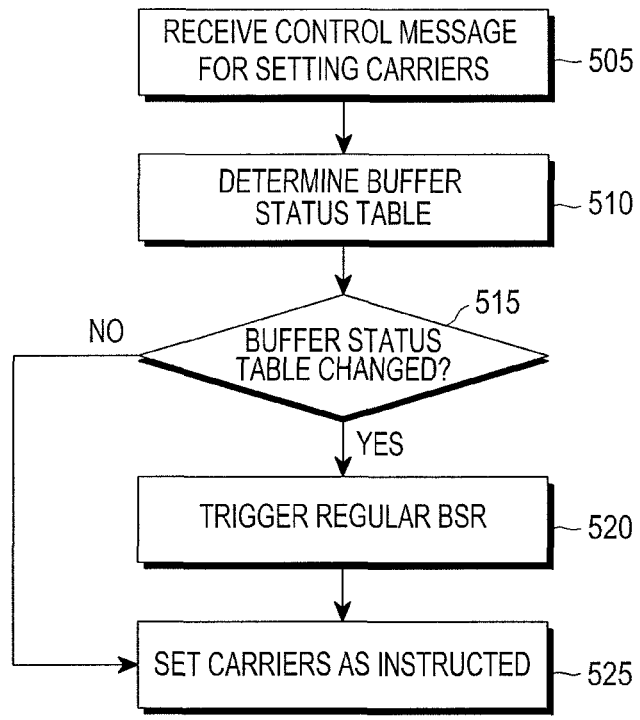
FIG. 5 illustrates an operation of a UE in the buffer status reporting method according to the first exemplary embodiment of the present invention.

FIG. 5 illustrates an operation of a UE in the buffer status reporting method according to the first exemplary embodiment of the present invention.

Referring to FIG. 5, the UE receives a control message for setting carriers, from an ENB, in step 505. The control message for setting carriers may be a control message for additionally setting a new carrier for the UE, or a control message for removing the carrier which is set for the UE. Upon receiving the control message, the UE determines in step 510 which buffer status table it will use, depending on the number of the set/added uplink carriers or the maximum uplink data rate by the set/added uplink carrier. The UE and the ENB determine the buffer status table by applying predefined rules. The rules may be, for example, as follows:

Rule 1
  The default buffer status table is used, if the number of uplink carriers which are set for the UE is one.
  The first buffer status table is used, if the number of uplink carriers which are set for the UE is two.
  The additional buffer status table [n−1] is used, if the number of uplink carriers which are set for the UE is n or more.

Rule 2
  The default buffer status table is used, if the maximum uplink data rate of the UE is less than or equal to x0 bps.
  The first buffer status table is used, if the maximum data rate of the UE is greater than x0 bps and less than or equal to x1 bps.
  The additional buffer status table n is used, if the maximum uplink data rate of the UE is greater than or equal to xn bps.

The control message sent in step 505 may include information indicating the buffer status table that the UE is to use. In this case, the UE uses the buffer status table indicated by the ENB. Upon determining the buffer status table it will use, the UE determines in step 515 whether the buffer status table has been changed. In other words, the UE triggers a regular BSR in step 520, if the UE is determined to use a buffer status table different from the previously used buffer status table as it receives the control message for setting carriers. The regular BSR is a BSR that is triggered if data is generated, which is higher in priority than the data stored in the UE. The details thereof are disclosed in Section 5.4.5 and Section 6.1.3.1 of 36.3221. Thereafter, in step 525, the UE performs an operation of setting uplink carriers as instructed by the control message. Since then, the UE determines a buffer status value of the BSR using the buffer status table determined in step 510.

Figure 6:
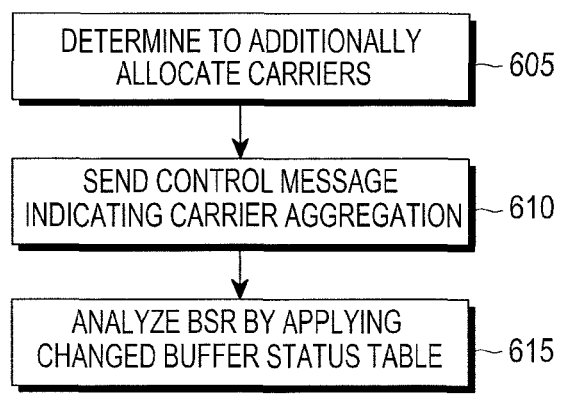
FIG. 6 illustrates an operation of an Evolved Node B (ENB) in the buffer status reporting method according to the first exemplary embodiment of the present invention.

FIG. 6 illustrates an operation of an ENB in the buffer status reporting method according to the first exemplary embodiment of the present invention.

Referring to FIG. 6, the ENB determines to additionally set a new uplink carrier(s) for a UE in step 605. For example, if the amount of data required by the UE increases, the ENB may additionally set uplink carriers. In step 610, the ENB generates a control message indicating carrier setting and sends it to the UE. The control message may include information indicating which buffer status table the UE should use. Based on the information indicated by the control message, the ENB determines the buffer status table that the UE is to use moving forward. The ENB may know which buffer status table the UE is to use, according to Rule 1 or Rule 2. If the control message is successfully sent, the ENB analyzes in step 615 the BSR that the UE transmits based on the buffer status table that is changed depending on the control message. To determine the buffer status of the UE, the BSR that the UE transmits later was generated in step 610 based on the buffer status table indicated by the control message. Therefore, the ENB may estimate the buffer status of the UE from the buffer status value based on the changed buffer status table.

Second Exemplary Embodiment

In order to clarify which buffer status table the UE uses in reporting a BSR, related information may be included in the BSR. The second exemplary embodiment of the present invention provides a method of indicating in which buffer status table a buffer status value of a BSR is referenced, using, for example, two unused bits of a subheader of the BSR. Prior to a description of the second exemplary embodiment of the present invention, formats of the BSR and the MAC PDU will be described. The BSR is control information of a MAC layer, by which a UE may report the amount of transmittable data to an ENB. The control information of the MAC layer, also known as a MAC Control Element (CE), is inserted in a MAC PDU during its transmission. In the BSR is written the amount of transmittable data for each logical channel group, and the amount of transmittable data is expressed by an index in the buffer status table (i.e., the index in the buffer status table will be called a buffer status value in exemplary embodiments of the present invention).

Figure 7:
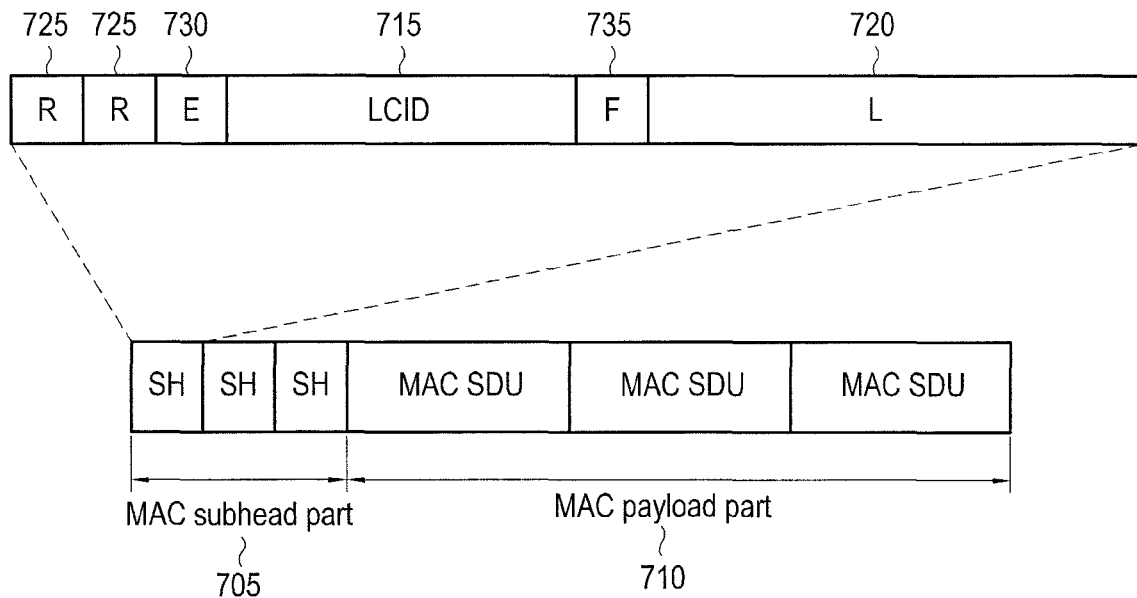
FIG. 7 illustrates a structure of a Medium Access Control (MAC) Packet Data Unit (PDU) applied to a buffer status reporting method according to a second exemplary embodiment of the present invention.

FIG. 7 illustrates a structure of a MAC PDU applied to a buffer status reporting method according to a second exemplary embodiment of the present invention.

Referring to FIG. 7, the MAC PDU includes a subheader part 705 and a payload part 710. As illustrated in the payload part 710, a plurality of MAC SDUs may be inserted in one MAC PDU, and the MAC SDUs are RLC PDUs which are upper layer data, or MAC CEs. As illustrated in the subheader part 705, one subheader is inserted per MAC SDU, and each subheader includes a logical channel identifier 715 indicating in which logical channel the MAC SDU is generated, and a Length (L) field 720 indicating the size of the MAC SDU. If the MAC SDU is a MAC CE, the logical channel identifier 715 indicates the type of the control information inserted in the MAC CE. In the current LTE standard, for example, 11010 indicates a PHR, and 11100 through 11110 indicate various BSRs. For reference, BSR is defined in three different types: long BSR, short BSR, and truncated BSR. 11100 indicates the long BSR, 11101 indicates the short BSR, and 11110 indicates the truncated BSR. The description of the types of the BSR are disclosed in Section 5.4.5 and Section 6.1.3.1 of the LTE Specification 36.321, so description thereof will be omitted. In addition, the subheader part 705 includes unused Reserved (R) bits 725, an E field 730 indicating whether the subheader is the last subheader, and an F bit 735 indicating the length of the L field.

Figure 8:
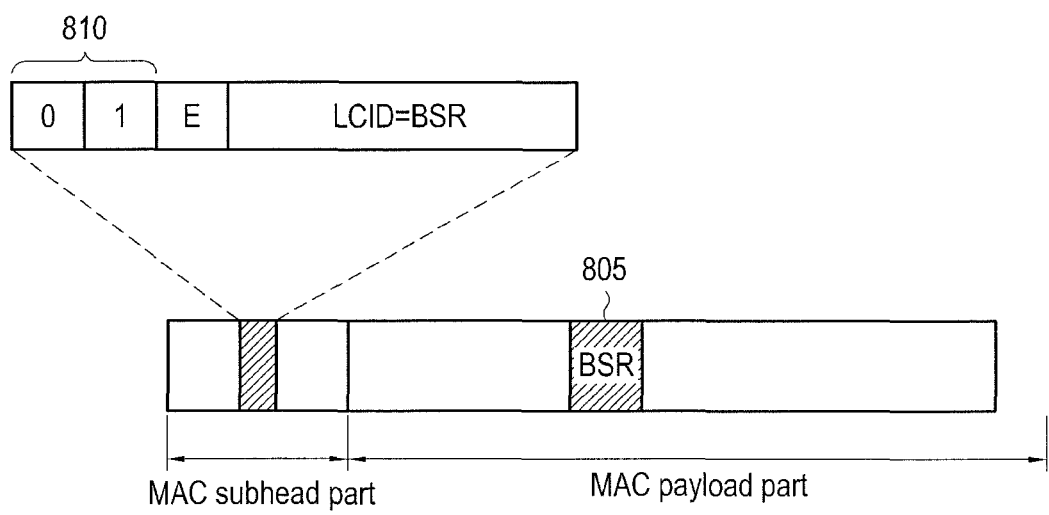
FIG. 8 illustrates the buffer status reporting method according to the second exemplary embodiment of the present invention.

FIG. 8 illustrates the buffer status reporting method according to the second exemplary embodiment of the present invention.

Referring to FIG. 8, the unused R bits 725 are used to indicate with which buffer status table the UE uses in generating a BSR. For example, a UE and an ENB each have four buffer status tables, and an identifier between 0 and 3 is assigned to each buffer status table. If a BSR that the UE generated at a certain time was generated using a buffer status table of 1, the UE sets R bits 810 of a subheader of a BSR 805 as "01" during its transmission. The ENB then determines based on which buffer status table the UE generated the BSR, based on the R bits 810 in the subheader of the BSR.

Figure 9:
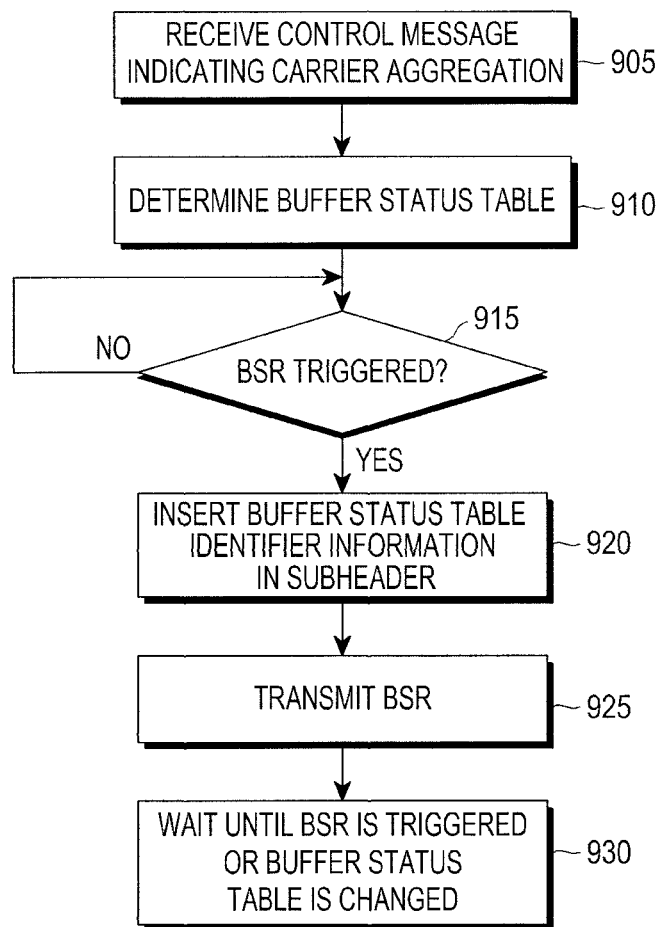
FIG. 9 illustrates an operation of a UE in the buffer status reporting method according to the second exemplary embodiment of the present invention.

FIG. 9 illustrates an operation of a UE in the buffer status reporting method according to the second exemplary embodiment of the present invention.

Referring to FIG. 9, upon receiving a control message indicating carrier setting from an ENB in step 905, the UE determines which buffer status table it will use, in step 910. A predefined identifier is assigned to each buffer status table, and the identifier information may be set for the UE in advance, or may be signaled to the UE in an initial call setup process for the UE. Thereafter, the UE waits until a BSR is triggered. If a BSR is triggered in step 915, the UE generates a BSR and a subheader using the buffer status table that is determined in step 910, in step 920. The R bits of the subheader are set to agree with the identifier of the buffer status table which was referenced during generation of the BSR. After generating the BSR and the subheader, the UE inserts the generated BSR and subheader in a MAC PDU and transmits the MAC PDU in step 925. In step 930, the UE waits until a BSR is triggered or the buffer status table is changed. Thereafter, although not illustrated in FIG. 9, if a BSR is triggered in step 930, the UE proceeds to step 920, and if the buffer status table is changed, the UE proceeds to step 915.

In the operation of the second exemplary embodiment of the present invention, the MAC PDU may be changed in the way of indicating only the change in the buffer status table, instead of directly indicating the buffer status table used by the UE, using the R bits 725 in the subheader part 705. In other words, the UE initializes a value of the R bits to "00" during its initial generation of a BSR. Thereafter, the UE increases a value of the R bits 725 by, for example, 1 whenever the buffer status table is changed, thereby making it possible to indicate whether the buffer status table used for the presently transmitted BSR is the same as the previously used buffer status table.

Third Exemplary Embodiment

If Downlink Component Carriers (DL CCs) having different frequency bands are set together, or DL CCs having different transmission positions are set together, the DL CCs may be different in reception timing that a UE experiences. Downlink carriers will be referred to as DL CCs, while uplink carriers will be referred to as UL CCs.

Figure 10:
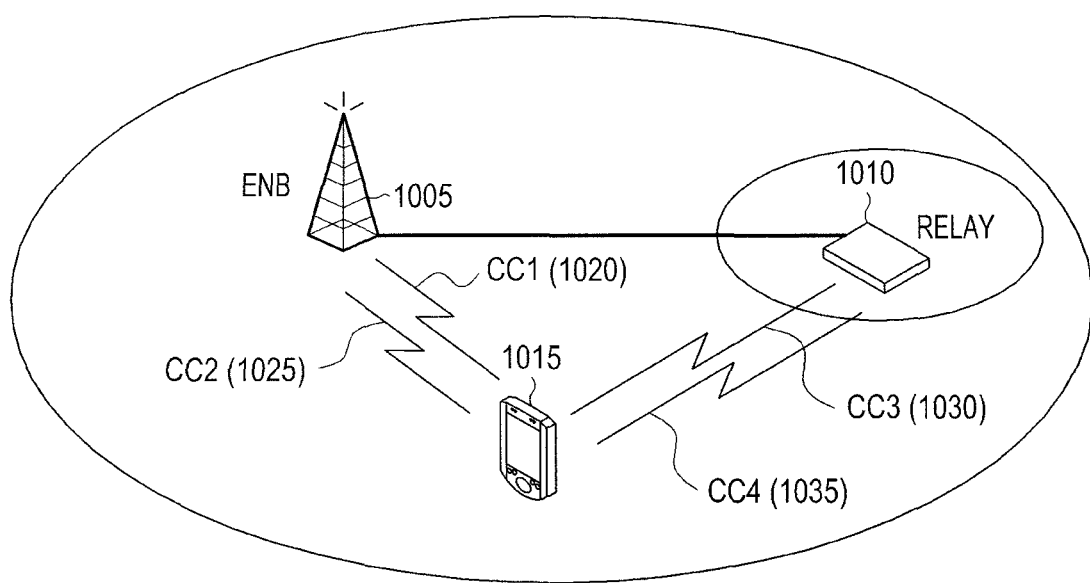
FIG. 10 illustrates a setting of a plurality of carriers for a UE in a buffer status reporting method according to a third exemplary embodiment of the present invention.

FIG. 10 illustrates a setting of a plurality of carriers for a UE in a buffer status reporting method according to a third exemplary embodiment of the present invention.

Referring to FIG. 10, a case will be considered, in which a UE 1015 receives a DL CC1 1020 and a DL CC2 1025 from an ENB 1005, and a DL CC3 1030 and a DL CC4 1035 from a relay 1010. Even DL CCs transmitted from the same position may be slightly different in timing that they are received at a UE, if they are different in frequency band. The DL CCs may show a significant difference in their reception timing, if they are transmitted from different positions.

Figure 11:
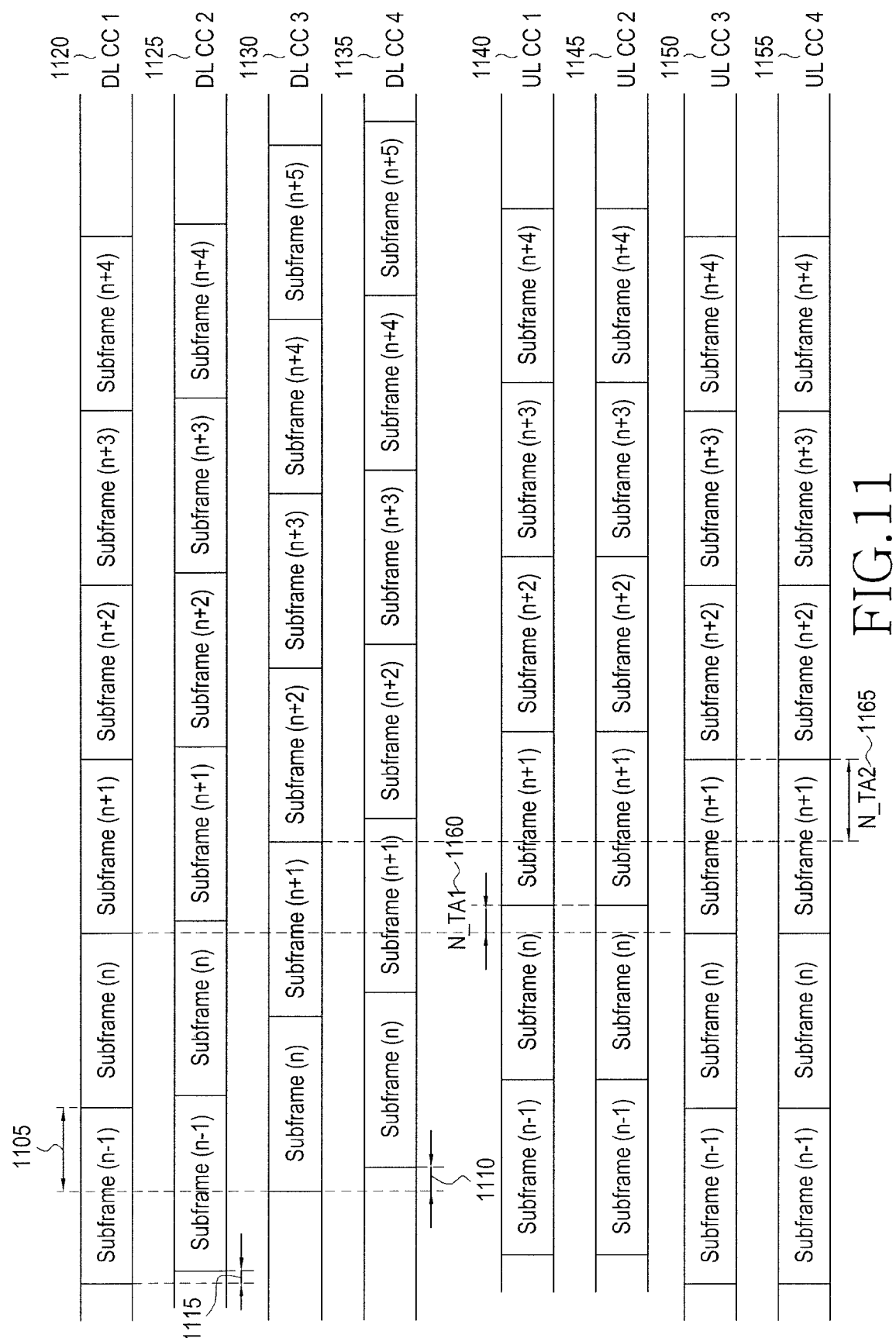
FIG. 11 illustrates timings of downlink subframes and uplink subframes for a UE in the buffer status reporting method according to the third exemplary embodiment of the present invention.

FIG. 11 illustrates timings of downlink subframes and uplink subframes for a UE in the buffer status reporting method according to the third exemplary embodiment of the present invention.

Referring to FIG. 11, a difference (i.e., reference numeral 1115) in reception timing between a DL CC1 1120 and a DL CC2 1125 transmitted from the same position, and a difference (i.e., reference numeral 1110) in reception timing between a DL CC3 1130 and a DL CC4 1135 transmitted from the same position are not so significant. On the other hand, a difference (i.e., reference numeral 1105) in reception timing between DL CCs having different transmission positions, e.g., between the DL CC1 1120 and the DL CC3 1130 may be significant. A boundary of an uplink frame is formed at the timing that is shifted from a boundary of a downlink frame by an interval indicated by an ENB. A difference between the downlink frame boundary and the uplink frame boundary is called N_Timing Advance (N_TA), and for the N_TA, the ENB notifies it to the UE in a random access process. If several DL CCs are aggregated, a frame boundary of a certain DL CC needs to be determined, based on which frame boundaries of UL CCs are to be set.

For convenience of description, a DL CC that provides reference timing for a frame boundary of an arbitrary UL CC will be called a reference DL CC for the UL CC. Since a DL CC and a UL CC are defined as a pair in a frequency band, it is general that a DL CC having the same frequency band as an arbitrary UL CC is used as a reference DL CC for the UL CC. However, individually defining uplink frame timings for a plurality of UL CCs may cause an increase in complexity of the UE, so it is preferable to define one reference DL CC for a plurality of UL CCs.

For example, referring to FIG. 11, assuming that a UL CC1 1140 has the same frequency band as a DL CC1 1120, a UL CC2 1145 has the same frequency band as a DL CC2 1125, a UL CC3 1150 has the same frequency band as a DL CC3 1130, and a UL CC4 1155 has the same frequency band as a DL CC4 1135, if a frame boundary difference 1115 between the DL CC1 1120 and the DL CC2 1125 is not so significant, one of the DL CC1 1120 and the DL CC2 1125 may be used as a reference DL CC for the UL CC1 1140 and the UL CC2 1145. If the DL CC1 1120 is used as a reference DL CC, frame boundaries of the UL CC1 1140 and the UL CC2 1145 are both adjusted together based on the DL CC1 1120. As a result, the UL CC1 1140 and the UL CC2 1145 have substantially the same frame boundary. Similarly, if the DL CC3 1130 is set as a reference DL CC for the UL CC3 1150 and the UL CC4 1155, frame boundaries of the UL CC3 1150 and the UL CC4 1155 are adjusted based on the DL CC3 1130. Therefore, according to the above-described manner, as illustrated in FIG. 11, the same N_TA1 1160 is applied to the UL CC1 1140 and the UL CC2 1145, and the N_TA1 1160 is applied based on the frame boundary of the DL CC1 1120 which is a reference DL CC. Another N_TA2 1165 is applied to the UL CC3 1150 and the UL CC4 1155, and the N_TA2 1165 is applied based on the frame boundary of the DL CC3 1130 which is a reference DL CC.

If downlink frames do not exactly match as described above, uplink grants are received at a UE with a time difference. For example, a MAC PDU generated by an uplink grant received in an n-th downlink subframe is transmitted in an [n+4]-th uplink subframe. As for uplink grants for MAC PDUs transmitted in UL CCs whose frame boundaries are set by the same reference DL CC, if uplink grants for the UL CCs are received by different DL CCs, they may be received at a UE with a slight time difference. For example, in FIG. 11, since uplink grants for an [n+4]-th subframe of the UL CC1 1140 and an [n+4]-th subframe of the UL CC2 1145 are received in an n-th subframe of the DL CC1 1120 and an n-th subframe of the DL CC2 1125, the timing that the UE completes the uplink grant reception in the DL CC1 1120 may be different from the timing that the UE completes the uplink grant reception in the DL CC2 1125. The uplink grants are transmitted in a Physical Downlink Control Channel (PDCCH) region of the downlink subframes, and the UE recognizes the uplink grants in order of the received downlink subframes. Upon receiving an uplink grant, the UE immediately performs an operation according to the contents of the uplink grant. For example, upon receiving an uplink grant, the UE performs an operation of distributing transmission resources allocated in the uplink grant to logical channels according to the priorities of the logical channels, fetching data from the logical channels depending on the amount of distributed transmission resources, and generating a MAC PDU by concatenating the fetched data. At this point, if a BSR is triggered, the UE starts an operation of generating a BSR the moment it receives a first uplink grant after the BSR is triggered, i.e., starts an operation of determining a type of a BSR, generating a MAC PDU, and determining a buffer status value it will report in the BSR taking into account the amount of remaining buffer. The operation may be quickly carried out since it is an operation of calculating the amount of transmittable data presently stored in the buffer, and the amount of allocated transmission resources. In other words, in FIG. 11, after completing the operation for the uplink grant received in an n-th subframe of the DL CC1 1120, the UE may receive another uplink grant in an n-th subframe of the DL CC2 1125.

Therefore, upon receiving one or more uplink grants in n-th subframes, the UE is highly likely to determine the type of a BSR and the buffer status value it will report in the BSR, taking into account only the first uplink grant. Upon receiving one or more uplink grants in an arbitrary subframe, the UE is allowed to determine the type of a BSR and the buffer status value it will report in the BSR, taking into account all uplink grants.

For example, assume that when the UE receives an uplink grant indicating transmission of 100-byte data in the DL CC1 1120 and receives an uplink grant indicating transmission of 100-type data in the DL CC2 1125 in FIG. 11, the UE has stored in advance 200-byte data of a logical channel group 1 and 200-byte data of a logical channel group 2. If the UE determines the type of a BSR and the amount of data it will report in the BSR, taking into account only the uplink grant received in the DL CC1 1120 in the manner of the related art, a long BSR is selected because data exists in the logical channel group 1 and the logical channel group 2 even after the UE transmitted 100 bytes in the logical channel group 1. Furthermore, it is reported that 100-byte data is stored in the logical channel group 1 and 200-byte data is stored in the logical channel group 2. On the other hand, if uplink grants received in the DL CC1 1120 and the DL CC2 1125 are both considered, a short BSR is selected since data of the logical channel group 1 is transmitted and only data of the logical channel group 2 remains, and it is reported that 200-byte data is stored in the logical channel group 2. It is apparent that the latter case provides more accurate information to the ENB.

In the third exemplary embodiment of the present invention, uplink carriers having the same uplink frame timing are grouped into one group (hereinafter referred to as an 'uplink transmission timing group'), and uplink carriers which are likely to provide uplink grants for uplink carriers in the same uplink transmission timing group are grouped into another group (hereinafter referred to as an 'uplink grant group'). In determining the format and contents of a BSR to be transmitted in an m-th subframe of uplink carriers in the same uplink transmission timing group, the UE determines the format and contents of the BSR taking into account all of the uplink grants to be applied in m-th subframes, after completing reception of a PDCCH region of (m−4)-th subframes of downlink carriers in the uplink grant group corresponding to the uplink transmission timing group. Referring to FIG. 11, the UL CC1 1140 and the UL CC2 1145 may be set as one uplink transmission timing group (or an uplink transmission timing group 1), and the UL CC3 1150 and the UL CC4 1155 may be set as another uplink transmission timing group (or an uplink transmission timing group 2). If the UL CC1 1140 is associated with the DL CC1 1120, the UL CC2 1145 is associated with the DL CC2 1125, the UL CC3 1150 is associated with the DL CC3 1130, and the UL CC4 1155 is associated with the DL CC4 1135 in terms of uplink scheduling, an uplink grant group corresponding to the uplink transmission timing group 1 includes the DL CC1 1120 and the DL CC2 1125, and an uplink grant group corresponding to the uplink transmission timing group 2 includes DL CC3 1130 and the DL CC4 1135.

Figure 12:
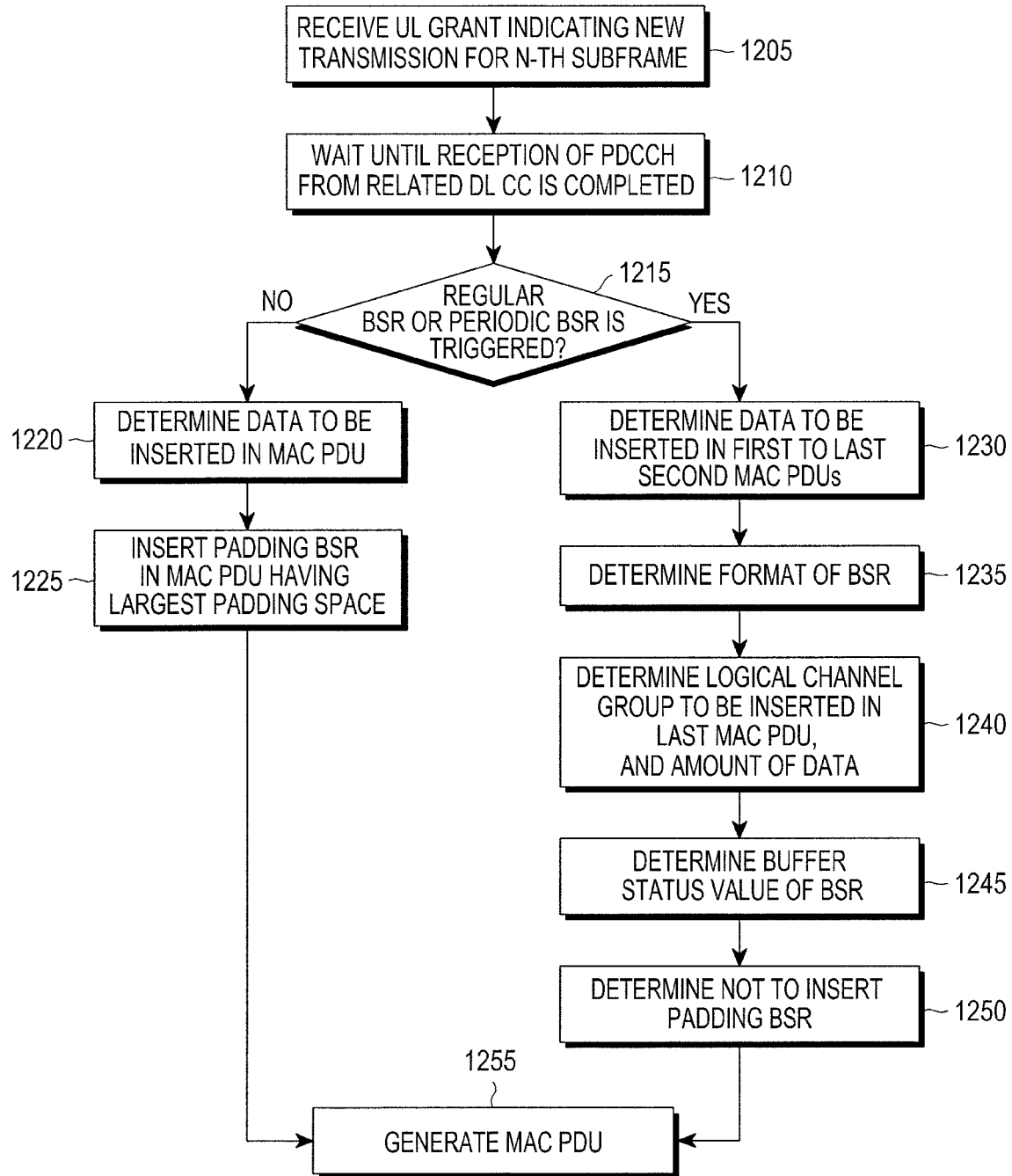
FIG. 12 illustrates a first operation of a UE in the buffer status reporting method according to the third exemplary embodiment of the present invention.

FIG. 12 illustrates a first operation of a UE in the buffer status reporting method according to the third exemplary embodiment of the present invention.

Referring to FIG. 12, upon receiving an uplink grant indicating new transmission for an arbitrary n-th uplink subframe in step 1205, the UE waits until it completes reception of a PDCCH from the downlink carriers from which the uplink grants are received, and all downlink carriers in the same uplink grant group, in step 1210. As described above, using a control message, such as carrier setting message, an ENB notifies the UE, as first information, which uplink carriers have substantially the same uplink transmission timing. The ENB also notifies the UE, as second information, from which downlink carrier an uplink grant can be received, for each uplink carrier. Using the two different types of information, the UE may recognize downlink carriers in the same uplink grant group. The UE recognizes downlink carriers on which uplink grants may be transmitted and received, for uplink carriers having substantially the same transmission timing, as downlink carriers in the same uplink grant group. For example, in FIG. 11, if the UL CC1 1140 and the UL CC2 1145 share the same uplink transmission timing (i.e., have the same uplink frame boundary), an uplink grant for the UL CC1 1140 can be received on the DL CC1 1120, and an uplink grant for the UL CC2 1145 can be received on the DL CC2 1125. As a result, the DL CC1 1120 and the DL CC2 1125 belong to the same uplink grant group. The phrase 'waiting until it completes reception of a PDCCH from the downlink carriers in the same uplink grant group' refers to receiving a signal transmitted from a PDCCH region of the downlink carriers and completing the analysis on the signal. In other words, it refers to completing determination of whether uplink grants have been received in the downlink carriers.

For an n-th uplink subframe, after completing reception of a PDCCH of the related DL CCs, the UE determines in step 1215 whether a regular BSR or a periodic BSR has been triggered. If one of the two different types of BSRs has been triggered, the UE proceeds to step 1230, in which the UE determines data to be inserted in a MAC PDU to be generated by each uplink grant in order of the received uplink grants from a first grant to the second to last grant (in the example of FIG. 11, for the same uplink subframe, an uplink grant that is transmitted and received in the DL CC1 1120 is received earlier than an uplink grant that is transmitted and received in the DL CC2 1125, so the uplink grant received in the DL CC1 1120 is the first grant and the uplink grant received in the DL CC2 1125 is the last grant). The determining of data to be inserted for each uplink grant is also expressed as 'performing a logical channel priority process,' and is disclosed in Section 5.4.3.1 of the LTE Specification 36.321. After determining the number of bytes of data, which are to be inserted in a MAC PDU, by performing the logical channel priority process for each uplink grant from the first grant to the last second grant, the UE proceeds to step 1235.

In step 1235, the UE determines whether it will generate a long BSR or a short BSR, based on the number of logical channel groups in which transmittable data remains when the amount of data to be inserted in MAC PDUs to be generated by the remaining grants, except for the last grant, is subtracted from the amount of transmittable data that is stored in the UE at that time. For example, the UE has received two uplink grants each indicating transmission of 100-byte data, and has stored 100-byte data in a logical channel group 1 and 500-byte data in a logical channel group 2. After performing the logical channel priority process on the first grant, if the UE has determined to insert 100-byte data in the logical channel group 1 into a MAC PDU, the UE selects a short BSR since the remaining transmittable data is 500-byte data in the logical channel group 2. After determining the format of the BSR as described above, the UE determines a logical channel group of the data to be inserted in the last MAC PDU and the amount of data in step 1240.

In step 1245, the UE determines the amount of data (i.e., buffer status value) it will report in the BSR, taking into account the amount of data to be inserted in the last MAC PDU. In other words, the UE selects a buffer status value corresponding to a value obtained by subtracting the amount of data to be inserted in all MAC PDUs including the last MAC PDU from the amount of transmittable data that the UE presently stores, for each logical channel group. In step 1250, the UE determines whether each MAC PDU has a padding space, and determines to insert no padding BSR even though the MAC PDU has a sufficient padding space to insert padding BSRs. This is to transmit only one BSR in MAC PDUs which are transmitted in the same subframe. Even though transmitted in the same subframe, MAC PDUs are transmitted on different uplink carriers through a separate Hybrid ARQ (HARQ) process, so the MAC PDUs may arrive at the ENB at different timings, causing the ENB to misrecognize the buffer status of the UE. To avoid this, the UE is adapted to insert only one BSR in MAC PDUs when transmitting a plurality of MAC PDUs in the same uplink subframe. Proceeding to step 1250 corresponds to using no padding BSR despite the sufficient padding space, since it means that a periodic BSR or a regular BSR will be transmitted. Therefore, it should be noted that a padding BSR is inserted in one of a plurality of MAC PDUs in step 1225, but no padding BSR is inserted in any of the plurality of MAC PDUs in step 1250.

However, if a periodic BSR or a regular BSR has not been triggered in step 1215, the UE determines data to be inserted in MAC PDUs corresponding to the received uplink grants in step 1220. In step 1225, the UE determines if there is any MAC PDU in which padding BSR may be inserted. If there are a plurality of MAC PDUs in which padding BSR may be inserted, the UE inserts a padding BSR in the MAC PDU having the largest padding space, or inserts a padding BSR in one selected MAC PDU, and determines not to insert a padding BSR in the remaining MAC PDUs. This is to prevent a short padding BSR from being inserted due to the insufficient padding space even though the number of logical channel groups in which transmittable data is stored is two or more. After determining whether to insert a padding BSR in step 1250 or 1225, the UE generates MAC PDUs and transfers them to its physical layer in step 1255, so they may be transmitted in n-th subframes.

In determining which data in which logical channel group it will insert in MAC PDUs to be transmitted in the same uplink subframes, the UE may sum up all of the received uplink grants for the uplink subframes and perform only once the logical channel priority process using the summed uplink grant according to the alternative third exemplary embodiment of the present invention. Exemplary embodiments of the present invention may be applied for this case. In this case, the intact UE operation presented in FIG. 12 is applied to the UE, except that the UE determines the format of a BSR before performing the logical channel priority process and determines the contents of the BSR after performing the logical channel priority process.

Figure 13:
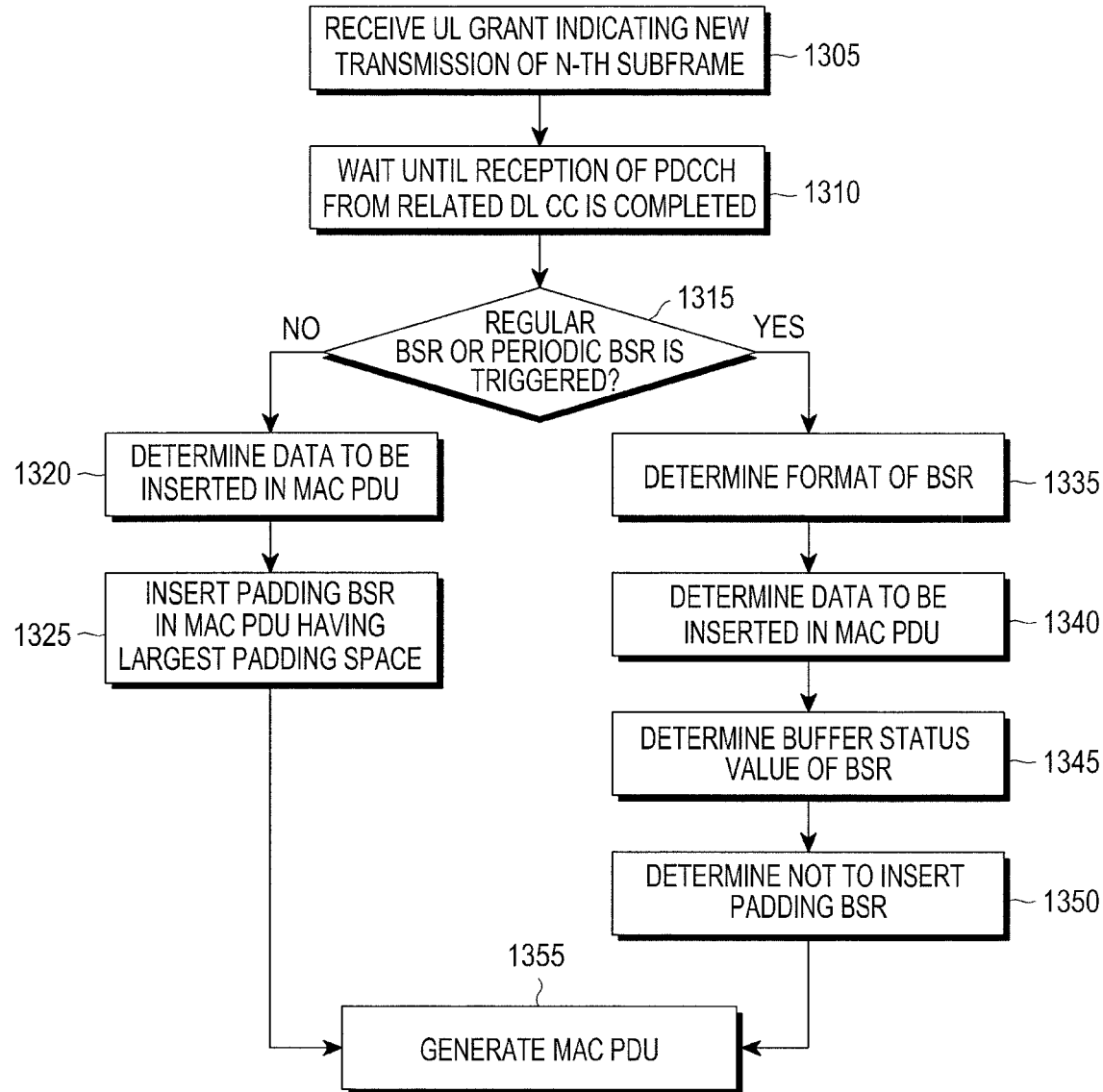
FIG. 13 illustrates a second operation of a UE in the buffer status reporting method according to the third exemplary embodiment of the present invention.

An operation of the alternative third exemplary embodiment of the present invention is as illustrated in FIG. 13.

FIG. 13 illustrates a second operation of a UE in the buffer status reporting method according to the third exemplary embodiment of the present invention.

Referring to FIG. 13, steps 1305, 1310, and 1315 are substantially the same as steps 1205, 1210 and 1215 in FIG. 12, so description thereof will be omitted. In step 1335, the UE determines the format of a BSR taking into account the number of logical channel groups that store transmittable data at that time. In step 1340, the UE adds up all of uplink grants, performs the logical channel priority process thereon, and determines the logical channel group in which data is to be inserted, and the amount of the data, for each MAC PDU. Steps 1345, 1350, and 1355 are substantially the same as steps 1245, 1250, and 1255 in FIG. 12, so description thereof will be omitted. In addition, step 1320 is substantially the same as step 1220, and step 1325 is substantially the same as step 1225.

The above-described third exemplary embodiment of the present invention may be summarized as follows. First, an ENB determines which uplink carriers will have substantially the same uplink frame timing when a plurality of uplink carriers are set for an arbitrary UE, and reports them to the UE. In determining the type and contents of a BSR it will transmit in an arbitrary subframe at a later time, the UE considers the size of all MAC PDUs to be transmitted in uplink carriers having substantially the same uplink frame timing as the subframe, and the type of data to be inserted in the MAC PDUs. In other words, the UE determines how much data in which logical channel group is included in all MAC PDUs to be transmitted in uplink carriers having substantially the same uplink frame timing, and determines the amount of data it will report in a BSR, for each logical channel group. If there are a plurality of MAC PDUs having a free space in which a padding BSR may be inserted, among the MAC PDUs which will be transmitted in uplink carriers having substantially the same uplink frame timing in which transmissions having substantially the same uplink frame timing will be performed. Thereafter, the UE may select one of the plurality of MAC PDUs, include a padding BSR only in the selected MAC PDU, and include padding in the free space of the remaining MAC PDUs, as in step 1225. In this case, no padding BSR is inserted in the remaining MAC PDUs.

Fourth Exemplary Embodiment

A UE has a PHR function to assist in scheduling of an ENB. If predefined conditions are met, the UE inserts a MAC CE, called a PHR, in a MAC PDU and transmits it to the ENB. In the PHR is inserted a difference between the required transmit power needed to transmit the MAC PDU and the maximum transmit power of the UE. The required transmit power is a value that is calculated taking into account values, such as the amount of transmission resources to be used for transmission of the MAC PDU, an MCS level, and a pathloss of associated downlink carriers, and description thereof is disclosed in Section 5.1.1 of the LTE Specification 36.213. The PHR will be referred to herein as a 'Physical Uplink Shared Channel (PUSCH) PHR' since it is associated with MAC PDUs transmitted over a PUSCH.

In a case of a UE having a plurality of carriers by carrier aggregation, the PHR function may be set individually for each uplink carrier, since the uplink carriers may be different in the power headroom. In addition, the PHR function may be extended up to a Physical Uplink Control Channel (PUCCH). If an ENB recognizes information about transmit power that the UE uses during PUCCH transmission, the ENB may more accurately determine how it should allocate PUSCH transmission resources in the subframes where the PUCCH is transmitted. For convenience of description, a PHR related to PUCCH transmission will be referred to herein as a 'PUCCH PHR'. Though the need for the PUCCH PHR has been discussed, various procedures for PUCCH PHR transmission have not been defined yet. The fourth exemplary embodiment of the present invention provides a method of linking the PUCCH PHR function to a PUSCH PHR function of a specific uplink carrier, to thereby avoid the need for a separate logical channel identifier indicating the PUCCH PHR and to avoid the hassle of separately defining PUCCH PHR trigger conditions.

Specifically, the PUCCH refers to Channel Quality Information (CQI) for reporting a downlink channel status of UEs, uplink HARQ feedback information, and a Dedicated Scheduling Request (D-SR), which is a signal that is transmitted to a UE on transmission resources having a pre-allocated cycle, and is used by the UE to request the ENB to allocate transmission resources. The PUCCH signals are transmitted only in a specific carrier, called a Primary Component Carrier (PCC), among a plurality of uplink carriers which are set for a UE. Therefore, unlike the PUSCH PHR which can be individually set in a plurality of uplink carriers, the PUCCH PHR is set only in an uplink PCC. In addition, if a PUSCH PHR is already set in an uplink PCC, trigger conditions of the PUCCH PHR may be linked to trigger conditions of the PUSCH PHR. In short, if the PUSCH PHR is triggered in an uplink PCC, the PUCCH PHR is triggered as well. The PUSCH PHR trigger conditions are defined taking into account the properties of uplink carriers. Thus, even for the channels having different properties, called a PUSCH and a PUCCH, if they are transmitted in the same carrier, the same trigger conditions may be applied to them. Finally, if the PUCCH PHR is defined to be transmitted always together with the PUSCH PHR, there is no need to use a separate logical channel identifier for the PUCCH PHR.

Figure 14A:
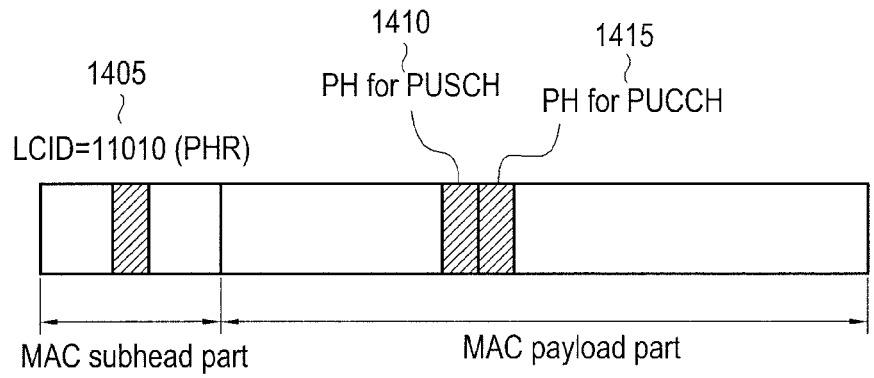
FIGS. 14A and 14B illustrate a power headroom reporting method according to a fourth exemplary embodiment of the present invention.
Figure 14B:
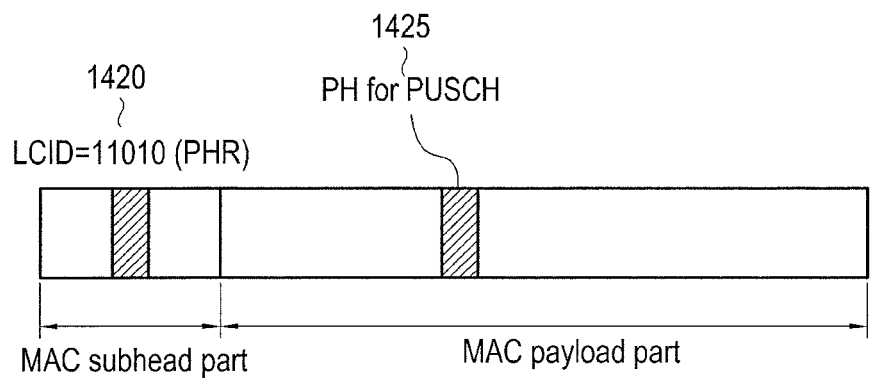

FIGS. 14A and 14B illustrate a power headroom reporting method according to a fourth exemplary embodiment of the present invention.

Referring to FIGS. 14A and 14B, assuming that a PHR MAC CE is inserted in an arbitrary MAC PDU, i.e., a logical channel identifier 1405 of a subheader indicates a PHR MAC CE, if the PHR MAC CE is a PHR MAC CE for an uplink PCC, a PUSCH PHR 1410 and a PUCCH PHR 1415 are both inserted in the PHR MAC CE as illustrated in FIG. 14A. FIG. 14B illustrates a logical channel identifier 1420 of a subheader indicating a PHR MAC CE. In this case, if the PHR MAC CE is not for an uplink PCC, only a PUSCH PHR 1425 is inserted in the PHR MAC CE as illustrated in FIG. 14B. There are two different exemplary methods of indicating to which UL CC an arbitrary PHR MAC CE corresponds. A first exemplary method is to indicate an identifier of a UL CC using a field unused in a PHR MAC CE or in a subheader for a PHR MAC CE. A second exemplary method is to restrict a PHR for an arbitrary UL CC to be transmitted only in the UL CC. Therefore, in the first exemplary method, if a predefined field of a PHR MAC CE or a predefined field of a subheader for a PHR MAC CE indicates an uplink PCC, both a PUSCH PHR and a PUCCH PHR are inserted in the PHR MAC CE, and if the predefined field indicates a UL CC other than the uplink PCC, only the PUSCH PHR is inserted in the PHR MAC CE. In the second exemplary method, both a PUSCH PHR and a PUCCH PHR are inserted in a PHR MAC CE of a MAC PDU transmitted in a UL PCC, and only the PUSCH PHR is inserted in a PHR MAC CE of a MAC PDU that is transmitted in a UL CC other than the UL PCC.

Figure 15:
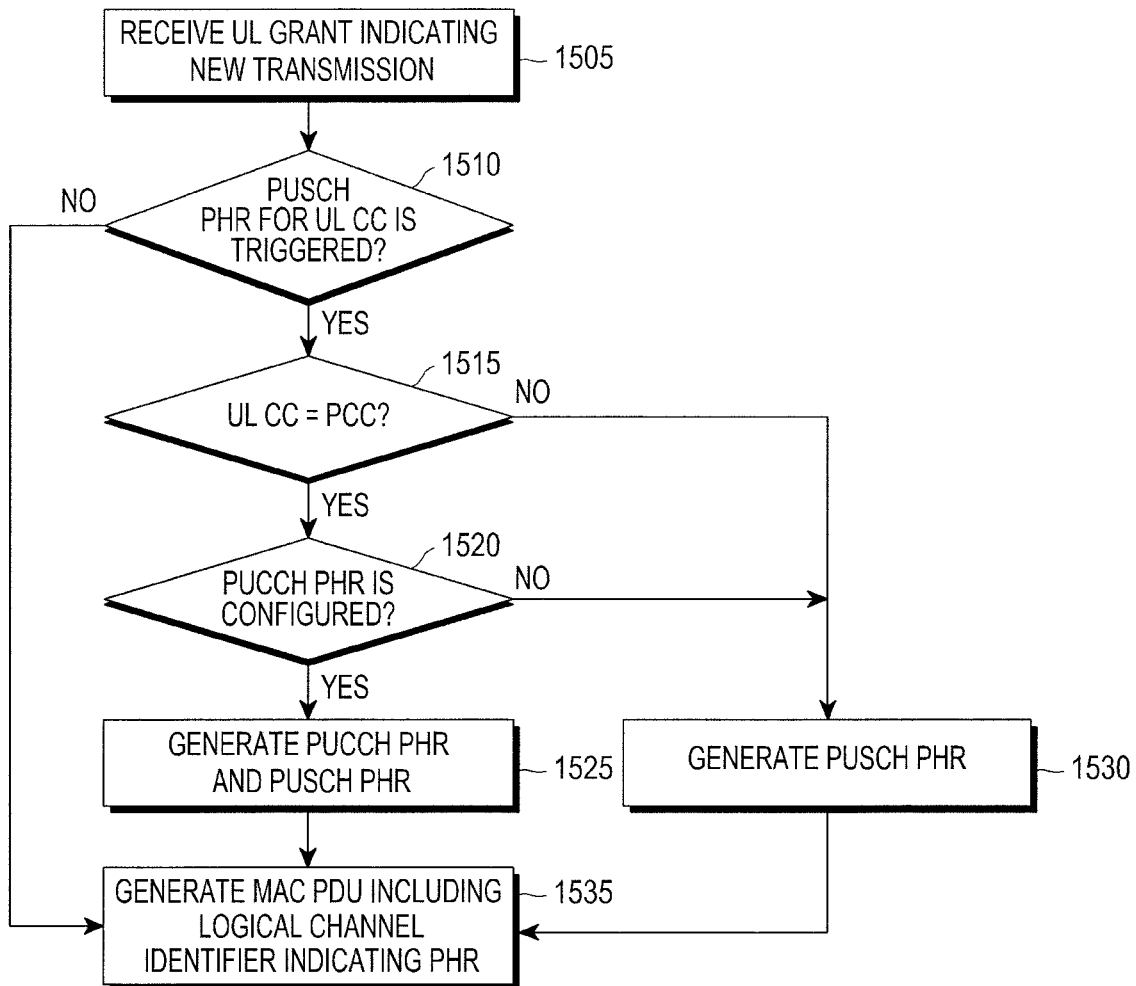
FIG. 15 illustrates an operation of a UE in the power headroom reporting method according to the fourth exemplary embodiment of the present invention.

FIG. 15 illustrates an operation of a UE in the power headroom reporting method according to the fourth exemplary embodiment of the present invention. In FIG. 15, a PUSCH PHR for an arbitrary UL CC is transmitted only in the UL CC.

Referring to FIG. 15, in step 1505, as uplink transmission resources indicating new transmission are allocated in an arbitrary UL CC, uplink transmission resources for new transmission are available for the UL CC. In step 1510, the UE determines if a PUSCH PHR for the UL CC has been triggered. The PUSCH PHR is triggered, for example, if a periodic PHR timer expires or if a change in pathloss of the related downlink carrier is greater than or equal to a predefined reference value. If the PUSCH PHR has been triggered, the UE determines in step 1515 whether a UL CC in which the PUSCH PHR has been triggered is a PCC. If the UL CC is a PCC, the UE proceeds to step 1520. If the UL CC in which the PUSCH PHR has been triggered is not a PCC, the UE proceeds to step 1530. In step 1520, the UE determines if a PUCCH PHR is configured. The PUCCH PHR may be configured or not configured depending on the determination of the network (e.g., an ENB). If the PUCCH PHR is not configured, the UE proceeds to step 1530 since the UE should not trigger the PUCCH PHR even though the PUSCH PHR for a UL PCC is triggered. If the PUCCH PHR is configured, the UE generates a PHR MAC CE including both power headroom information for a PUSCH and power headroom information for a PUCCH in step 1525. The PUSCH power headroom information and the PUCCH power headroom information each have, for example, a 1-byte size, and the power headroom information may be written in the remaining 6 bits except for the first two bits.

After generating the PHR MAC CE, the UE generates a MAC PDU in step 1535. In other words, the UE sequentially concatenates MAC SDUs to be put in a payload part of the MAC PDU, and MAC subheaders thereof. The PHR MAC CE has, for example, a 2-byte size, since the power headroom information for a PUSCH and the power headroom information for a PUCCH are both inserted in the PHR MAC CE. The UE writes a logical channel identifier indicating a PHR, in a MAC subheader of the PHR MAC CE. In step 1530, the UE generates a PHR MAC CE containing only the power headroom information for a PUSCH. The PHR MAC CE containing only the power headroom information for a PUSCH has, for example, a 1-byte size, similar to that of the related art. After generating the PHR MAC CE, the UE generates a MAC PDU in step 1535 and a logical channel identifier indicating a PHR is written in a MAC subheader of the PHR MAC CE.

Figure 16:
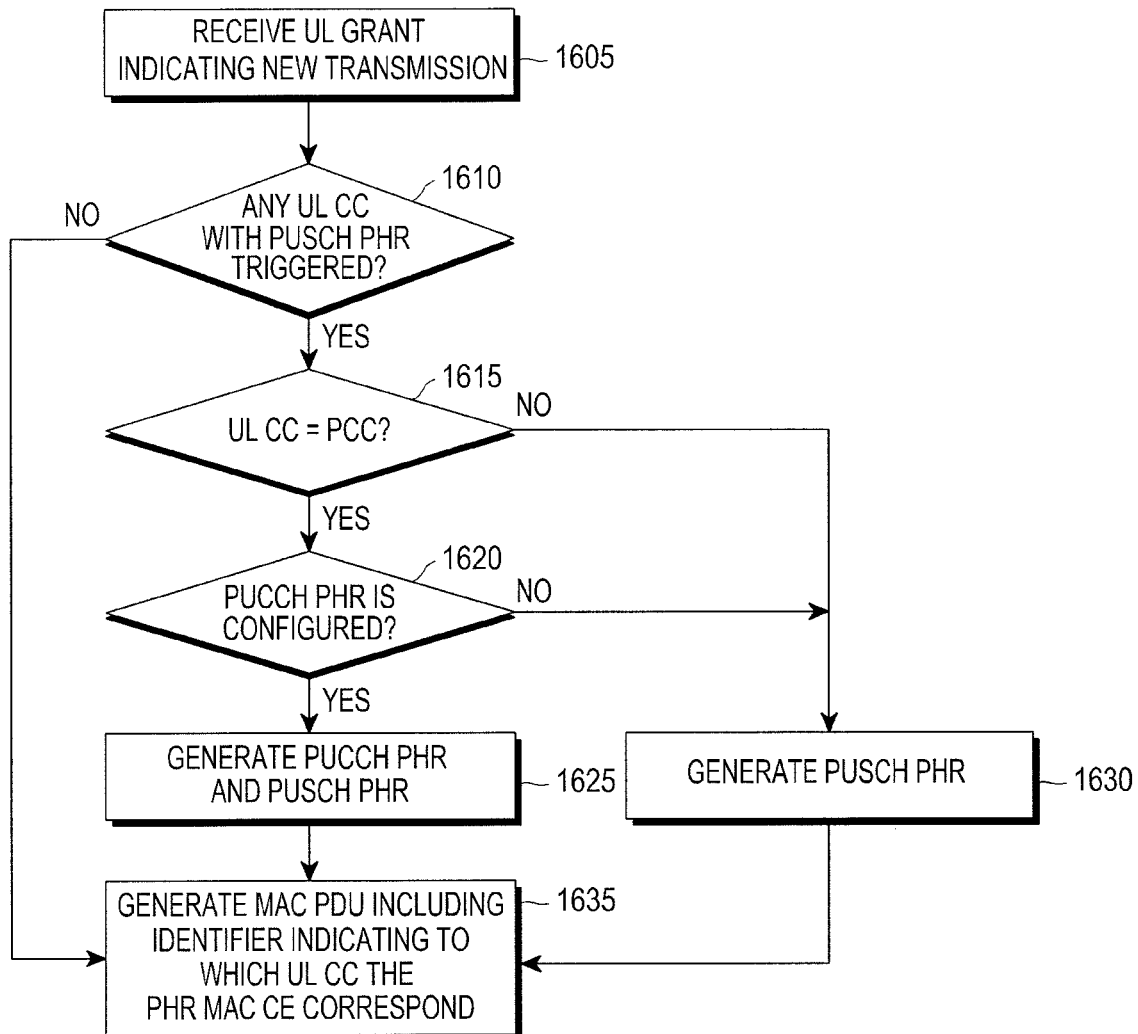
FIG. 16 illustrates an operation of a UE in the power headroom reporting method according to the fourth exemplary embodiment of the present invention.

FIG. 16 illustrates an operation of a UE in the power headroom reporting method according to the fourth exemplary embodiment of the present invention. In FIG. 16, information indicating to which UL CC a PHR corresponds is inserted in a predefined field of a PHR MAC CE or a predefined field of a subheader thereof.

Referring to FIG. 16, in step 1605, as uplink transmission resources indicating new transmission are allocated in an arbitrary UL CC, uplink transmission resources for new transmission are available for the UL CC. In step 1610, the UE determines if a UL CC in which a PUSCH PHR has been triggered exists among the UL CCs for which a PHR function is set. The PUSCH PHR is triggered, for example, if a periodic PHR timer expires or if a change in pathloss of the related downlink carrier is greater than or equal to a predefined reference value. If a PUSCH PHR has been triggered in an arbitrary UL CC, the UE determines in step 1615 whether the UL CC in which the PUSCH PHR has been triggered is a PCC. If the UL CC is a PCC, the UE proceeds to step 1620. If the UL CC in which the PUSCH PHR has been triggered is not a PCC, the UE proceeds to step 1630. In step 1620, the UE determines if a PUCCH PHR is configured. The PUCCH PHR may be configured or not configured depending on the determination of the network. If the PUCCH PHR is not configured, the UE proceeds to step 1630 since the UE should not trigger the PUCCH PHR even though the PUSCH PHR for a UL PCC is triggered. If the PUCCH PHR is configured, the UE generates a PHR MAC CE including both power headroom information for a PUSCH and power headroom information for a PUCCH in step 1625. After generating the PHR MAC CE, the UE generates a MAC PDU in step 1635. In other words, the UE sequentially concatenates MAC SDUs to be put in a payload part of the MAC PDU, and MAC subheaders thereof. The PHR MAC CE has, for example, a 2-byte size, since the power headroom information for a PUSCH and the power headroom information for a PUCCH are both inserted in the PHR MAC CE. The UE writes a logical channel identifier indicating a PHR, in a MAC subheader of the PHR MAC CE. In addition, the UE inserts an identifier indicating to which UL CC the PHR MAC CE corresponds, in the first two bits of the MAC subheader. In step 1630, the UE generates a PHR MAC CE containing only the power headroom information for a PUSCH. The PHR MAC CE containing only the power headroom information for a PUSCH has, for example, a 1-byte size, similar to that of the related art. After generating the PHR MAC CE, the UE generates a MAC PDU in step 1635. The PHR MAC CE has a 1-byte size, and a logical channel identifier indicating a PHR is written in a MAC subheader of the PHR MAC CE.

In addition, the UE inserts an identifier indicating to which UL CC the PHR MAC CE corresponds, in the first two bits of the MAC subheader.

Figure 17:
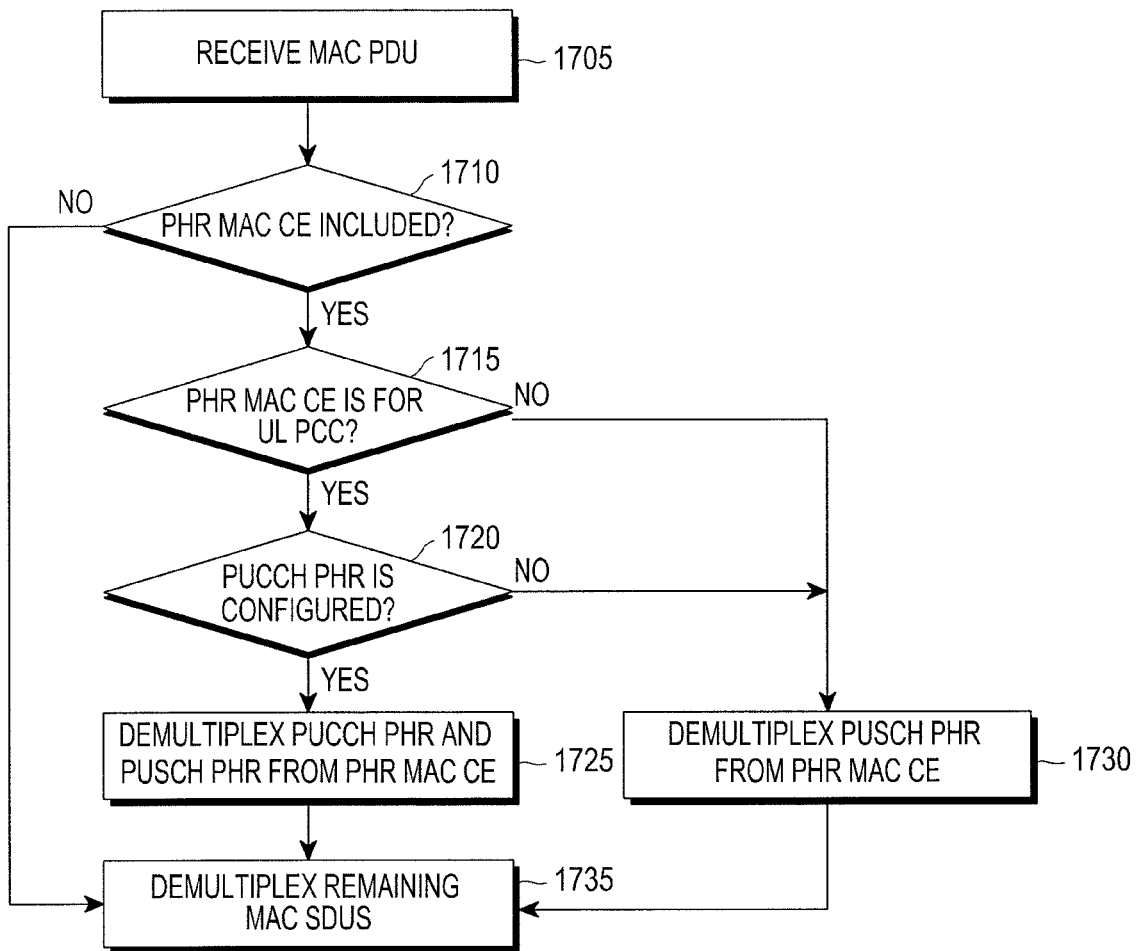
FIG. 17 illustrates an operation of an ENB in the power headroom reporting method according to the fourth exemplary embodiment of the present invention.

FIG. 17 illustrates an operation of an ENB in the power headroom reporting method according to the fourth exemplary embodiment of the present invention.

Referring to FIG. 17, upon receiving a MAC PDU in an arbitrary UL CC in step 1705, the ENB determines in step 1710 whether a PHR MAC CE is included in the MAC PDU. If the PHR MAC CE is included, the ENB determines in step 1715 whether the PHR MAC CE is for a UL PCC. If an identifier indicating to which UL CC the PHR MAC CE corresponds is written in the PHR MACE CE or a subheader thereof as in the example of FIG. 16, the ENB determines the identifier to determine whether the PHR MAC CE is for a UL PCC. If the PHR MAC CE for an arbitrary UL CC is transmitted only in the UL CC as in the example of FIG. 15, the ENB determines whether a UL CC in which the PHR MAC CE is received is a UL PCC, to determine if the PHR MAC CE is for a UL PCC. If it is determined in step 1715 that the received PHR MAC CE is for a UL PCC, the ENB determines in step 1720 whether a PUCCH PHR is configured in the UE. If the PUCCH PHR is configured, the ENB demultiplexes power headroom information for a PUSCH and power headroom information for a PUCCH from the received MAC PDU in step 1725, and proceeds to step 1735. If it is determined in step 1715 that the received PHR MAC CE is not for a UL PCC, or if the PUCCH PHR is not configured in step 1720, the ENB demultiplexes power headroom information for a PUSCH from the MAC PDU in step 1730, and proceeds to step 1735. Thereafter, in step 1735, the ENB demultiplexes the remaining MAC SDUs by analyzing the MAC subheaders, and transfers them to proper devices.

Figure 28:
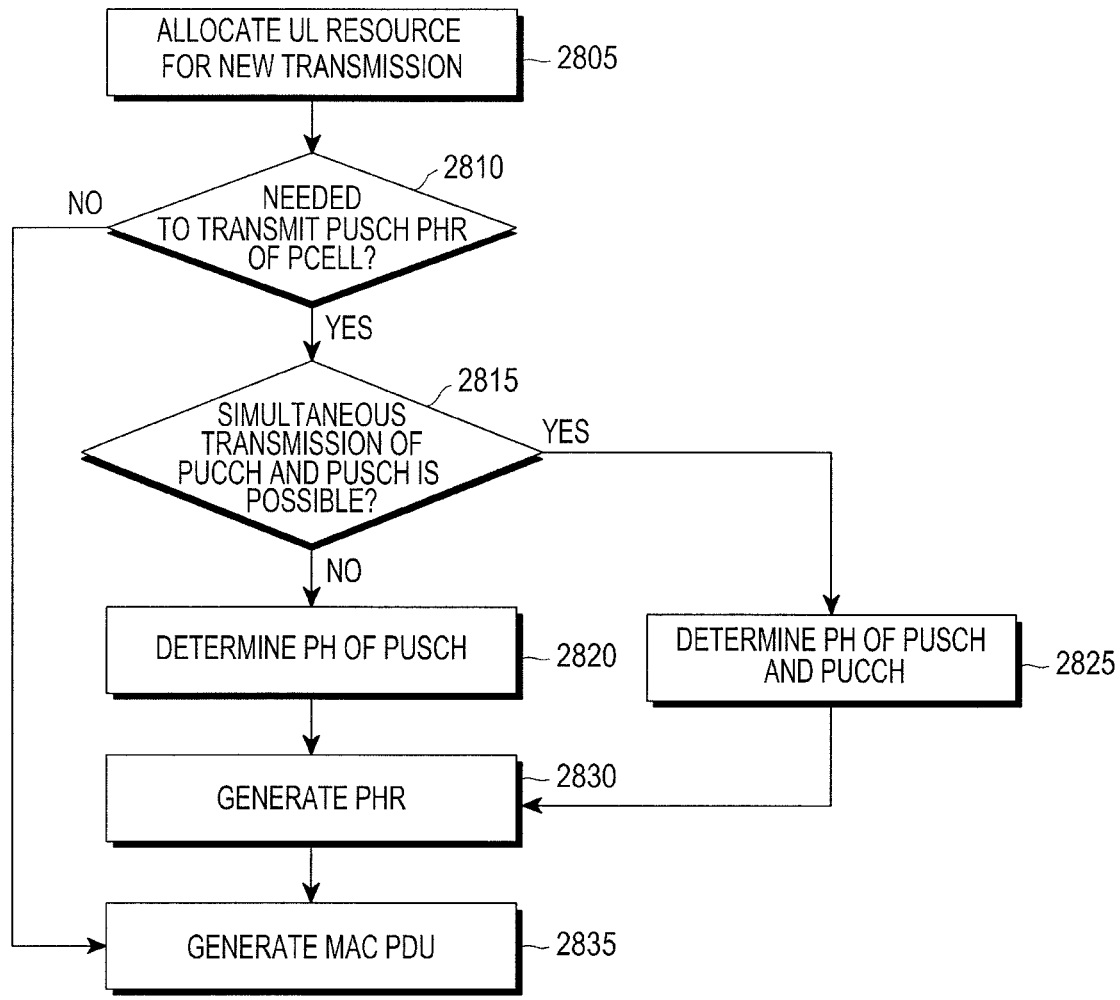
FIG. 28 illustrates an operation of a UE in the power headroom reporting method according to the fourth exemplary embodiment of the present invention.

FIG. 28 illustrates an operation of a UE in the power headroom reporting method according to the fourth exemplary embodiment of the present invention.

Referring to FIG. 28. if uplink transmission resources for new transmission are allocated to a UE in step 2805, the UE determines in step 2810 whether a PUSCH PHR of a Primary Cell (Pcell) needs to be transmitted. A PCell, as presented in TS 36.300, has similar meanings to the primary carrier. If the PUSCH PHR of the PCell needs to be transmitted, it corresponds to a case in which a PUSCH PHR of the PCell needs to be transmitted, for example, if a change in pathloss has exceeded a reference value or if a periodic timer has expired. If transmission of a PUSCH PHR of the PCell is needed, the UE proceeds to step 2815, and otherwise, the UE proceeds to step 2835. In step 2815, the UE determines whether simultaneous transmission of a PUCCH and a PUSCH is possible. Whether simultaneous transmission of a PUCCH and a PUSCH is possible is related to the UE's unique capability, and the simultaneous transmission may be possible or impossible depending on the UE's unique capability. If simultaneous transmission of a PUCCH and a PUSCH is possible, the UE proceeds to step 2825, reporting a PUCCH PHR and a PUSCH PHR together. The UE calculates a power headroom of the PUCCH and a power headroom of the PUSCH in step 2825, and generates a PHR MAC CE containing the power headroom information of the PUCCH and the power headroom information of the PUSCH in step 2830. The UE inserts a predefined Logical Channel Identification (LCID) in a MAC subheader of the PHR MAC CE, to indicate that the MAC CE is a PHR MAC CE. If it is determined in step 2815 that the UE's simultaneous transmission of a PUCCH and a PUSCH is not possible, the UE calculates power headroom information of the PUSCH in step 2820, and generates a PHR MAC CE containing the power headroom information of the PUSCH in step 2830. The UE inserts a predefined LCID in a MAC subheader of the PHR MAC CE to indicate that the MAC CE is a PHR MAC CE. In an exemplary embodiment of the present invention, depending on the UE performance or the UE settings, only a predefined UE reports a PUCCH PHR and a PUSCH PHR together, and another predefined UE reports only the PUSCH PHR. A UE, which reports a PUCCH PHR and a PUSCH PHR together, always triggers and transmits a PUCCH PHR and a PUSCH PHR together, so both of a PHR containing a PUCCH PHR and a PUSCH PHR together and a PHR containing only the PUSCH PHR use the same LCID. In other words, there is no need to use a separate LCID for the PUCCH PHR. In step 2835, the UE generates and transmits the MAC PDU, which may contain a PHR MAC CE.

Fifth Exemplary Embodiment

Even though a PHR function is set for an arbitrary uplink carrier, the PHR function is not always essential in the uplink carrier. For example, if all downlink carriers, which are associated with an arbitrary uplink carrier in terms of scheduling, are in an inactive state or if a channel status of downlink carriers providing a pathloss for calculating uplink transmit power of the uplink carrier is considered a no-service state because the channel status is extremely poor, then data transmission over the uplink carrier is impossible. Operating the PHR function for the uplink carrier even in this situation may result in performing unnecessary operations, such as driving timers and determining whether a PHR is triggered.

The fifth exemplary embodiment of the present invention provides a method of temporarily stopping a PHR function for an uplink carrier in the above-mentioned situation.

Figure 18:
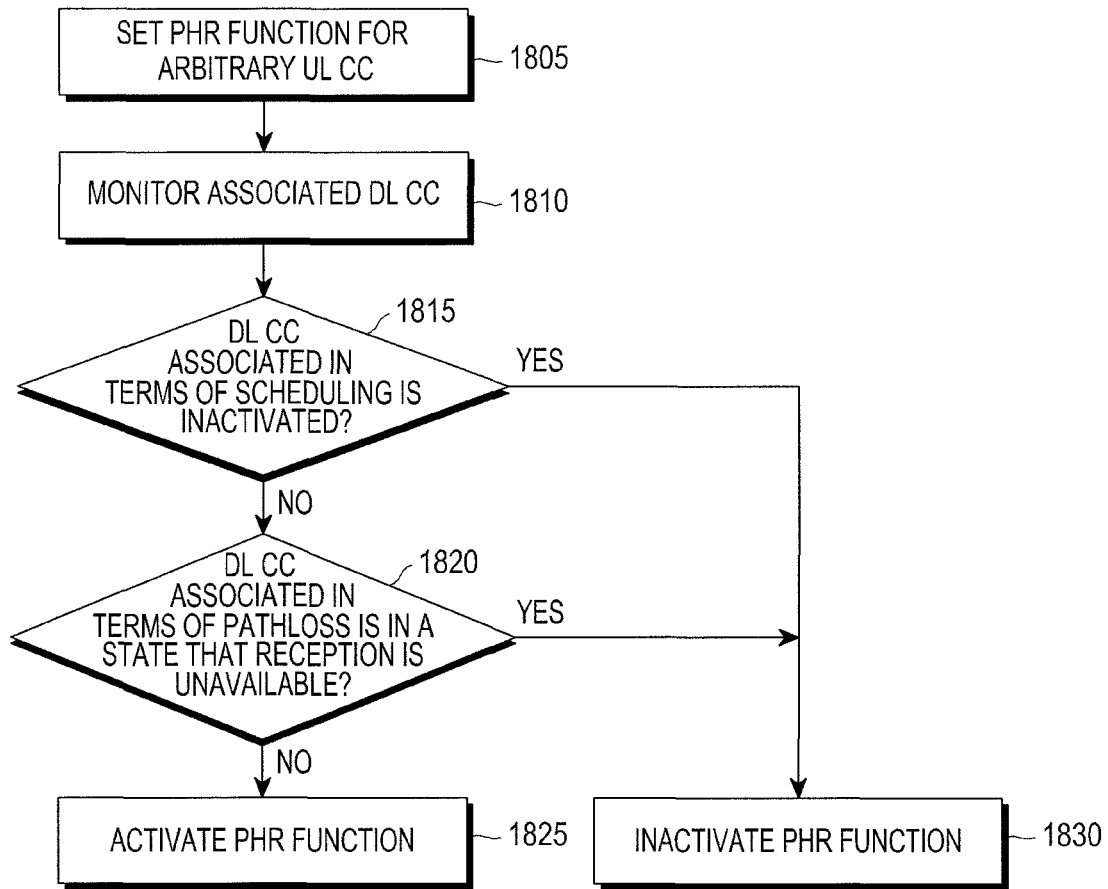
FIG. 18 illustrates an operation of a UE in a power headroom reporting method according to a fifth exemplary embodiment of the present invention.

FIG. 18 illustrates an operation of a UE in a power headroom reporting method according to a fifth exemplary embodiment of the present invention.

Referring to FIG. 18, a PHR function is set for an arbitrary uplink carrier of the UE in step 1805. The phrase 'a PHR function is set for an arbitrary uplink carrier' means that a periodic PHR timer and a pathloss change criteria are set for the carrier. The UE determines whether a PHR for the uplink carrier is triggered, based on the reported timer value of the periodic PHR timer and the pathloss change criteria. In step 1810, the UE monitors a downlink carrier(s) associated with the uplink carrier for which the PHR function is set. The downlink carrier to be monitored may include a downlink carrier that is associated with the uplink carrier in terms of scheduling, and a downlink carrier that is associated with the uplink carrier in terms of pathloss. The phrase 'an arbitrary uplink carrier is associated with an arbitrary downlink carrier in terms of scheduling' means that a scheduling command (i.e., an uplink grant) for the uplink carrier is transmitted and received only over the downlink carrier. The association information may be set in a control message indicating carrier setting. The phrase 'an arbitrary uplink carrier is associated with an arbitrary downlink carrier in terms of pathloss' means that a pathloss of the associated downlink carrier is used in calculating transmit power of the uplink carrier. The association information may be set in a control message for setting carriers. The association in terms of scheduling and the association in terms of pathloss may or may not be the same. In step 1815, the UE determines if the downlink carrier associated in terms of scheduling is in an inactive state. The phrase 'an arbitrary downlink carrier is in an inactive state' means that the UE has not received a PDCCH of the downlink carrier. In order to minimize power consumption of a UE, an ENB inactivates the remaining carriers except for the carriers needed among the downlink carriers set for the UE. The ENB may activate or inactivate an arbitrary downlink carrier by sending an explicit control command to the UE. If all downlink carriers, which are associated in terms of scheduling with the uplink carrier for which the PHR function is set, are inactivated, the need to perform the PHR function is reduced because it means that scheduling for the uplink carrier is impossible, and the UE proceeds to step 1830. If at least one downlink carrier, which is associated in terms of scheduling with the uplink carrier for which the PHR function is set, is activated, the UE determines in step 1820 whether downlink carriers, which are associated with the uplink carrier in terms of pathloss, are not in a normal reception state due to their poor channel reception quality, by determining whether the channel reception quality of the downlink carriers is lower than or equal to a predefined reference value for at least a predefined time. If the downlink carriers associated in terms of pathloss are not in a normal service state in step 1820, normal uplink transmission is likely to be difficult due to high pathloss during uplink transmission over the uplink carrier. Therefore, the UE inactivates the PHR function in step 1830. The inactivating of the PHR function may refer to stopping the driving of the periodic PHR timer and discarding the information which has been stored to determine whether the PHR is triggered. However, if the downlink carriers associated in terms of scheduling are activated in step 1815 and the downlink carriers associated in terms of pathloss are not in a no-service state in step 1820, the UE activates the PHR function in step 1825. If the PHR function has already been activated, the UE maintains the current activated state of the PHR function. The activating of the PHR function may refer to driving the periodic PHR timer and determining whether the PHR is triggered, by determining a change in the pathloss during uplink transmission. If the PHR function is switched from the inactivated state to the activated state in step 1825, the UE drives the periodic PHR timer and newly triggers the PHR. The PHR function for an arbitrary uplink carrier is switched from the inactivated state to the activated state, in order for the UE to report the PHR to the ENB because it is highly likely that the PHR has not been reported for the uplink carrier for a long time.

Sixth Exemplary Embodiment

The phrase 'a PHR function is set for each uplink carrier' means that a PHR timer is independently driven for each carrier and the PHR is independently triggered. The PHR timer is for periodic transmission of a PHR, and if the PHR is transmitted, the PHR timer is driven. Expiration of a periodic PHR timer triggers a PHR. A triggered PHR is generated at the nearest time the uplink transmission is possible (e.g., if an uplink grant is first received after a PHR is triggered), and inserted in a MAC PDU before its transmission. The PHR timer is driven by transmission of a PHR, and because the transmission of a PHR is triggered by expiration of the PHR timer, the driving of the PHR timer and the transmission of a PHR has a circular casual relationship. However, if the PHR timer is stopped due to, for example, a handover, the PHR timer is not re-started unless a new PHR is transmitted after the handover is completed. In a handover process, the UE stops all timers which are being driven in its MAC layer. If the stopped PHR timers are not re-started after the handover is completed, the periodic PHR function may be stopped unintentionally. In the related art, in order to address these problems that PHR timers are not re-started after the handover, it is provided that the UE drives PHR timers if it performs first uplink transmission in a new cell after the handover. However, if the UE drives a PHR timer for a carrier after performing first uplink transmission in an arbitrary carrier in a new cell in this way, a significant delay may occur until PHR timers for uplink carriers, for which PHR timers are set, are all re-started. In this regard, there is no need to trigger a PHR upon completion of a handover, because the PHR is less important than a BSR. Even so, the UE needs to transmit a PHR as soon as possible to the ENB that has no information about power headroom of the UE. To this end, the sixth exemplary embodiment of the present invention provides a method, in which if a UE first performs uplink transmission after a MAC reset, it drives all of periodic PHR timers for uplink carriers for which a periodic PHR function is set.

Figure 19:
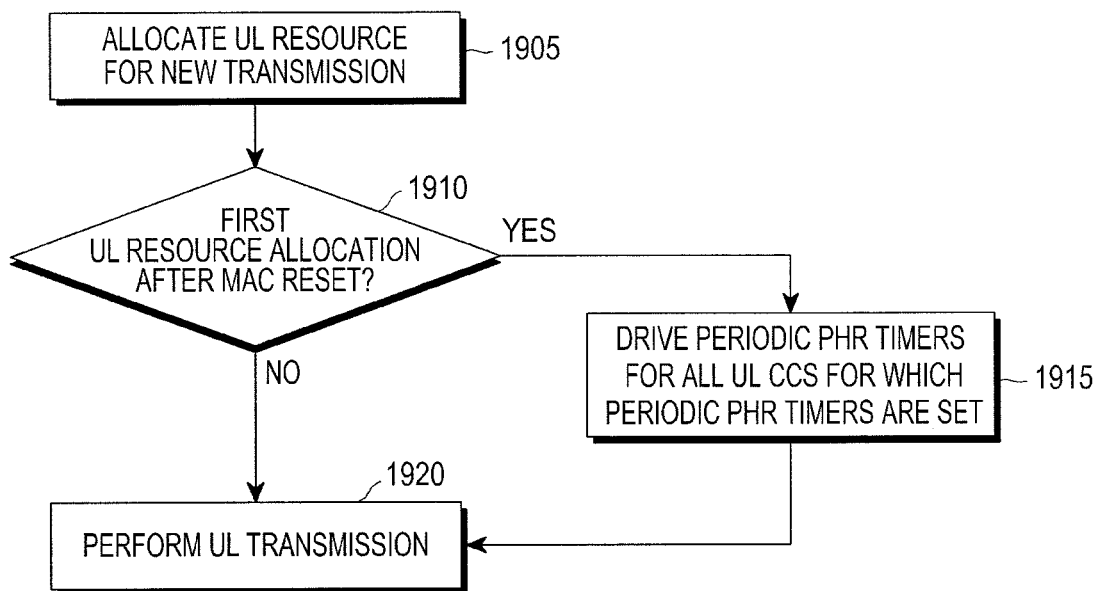
FIG. 19 illustrates an operation of a UE in a power headroom reporting method according to a sixth exemplary embodiment of the present invention.

FIG. 19 illustrates an operation of a UE in a power headroom reporting method according to a sixth exemplary embodiment of the present invention.

Referring to FIG. 19, in step 1905, as uplink transmission resources indicating new transmission are allocated in an arbitrary UL CC, uplink transmission resources for new transmission are available for the UL CC. In step 1910, the UE determines if the newly available transmission resources for new transmission are transmission resources for new transmission, which are first available after a MAC reset. If so, the UE drives all of periodic PHR timers for uplink CCs for which periodic PHR timers are set, in step 1915. Because the timers were stopped by the UE when it performs the MAC reset, if they are not re-started after the MAC reset, the periodic PHR function may be unintentionally inactivated. Thereafter, in step 1920, the UE generates a MAC PDU it will transmit over the available transmission resources, and transmits the MAC PDU over the transmission resources. If it is not first resource allocation after the MAC reset in step 1910, the UE performs normal UL transmission.

Seventh Exemplary Embodiment

A seventh exemplary embodiment of the present invention provides a method of triggering a new buffer status report for efficiently reporting a buffer status of a UE to an ENB in a high-speed data communication environment. In a high-speed data communication environment where a large amount of data can be transmitted in one subframe, for example, in an environment where a plurality of uplink carriers are aggregated, the buffer status that the UE has most recently reported may rapidly change while the ENB may not recognize the change. For example, even though the UE has stored transmittable data of 1,000,000 bytes, it may report that the amount of its transmittable data is 150,000 bytes or more because of the limits of the buffer status tables. For example, the UE may report a buffer status value of 63 in the default buffer status table. If the ENB has commanded the UE to transmit data of, for example, 150,000 bytes at once since the UE has a very good channel condition and the cell has a low load, the ENB may not properly allocate grants to the UE until it receives a new buffer status report, because the ENB cannot determine the amount of data that the UE now stores. Thus, after transmitting a large amount of data, the UE needs to trigger a new buffer status report.

As a first exemplary method proposed by the present invention, a transmission amount-based trigger method is provided, in which a UE triggers a buffer status report whenever it transmits at least a predefined amount of data. In the transmission amount-based trigger method, which is already commonly used, a UE performs a predefined operation after transmitting data, the amount of which is greater than or equal to a predefined reference value. In the method of the related art, buffer status reports may frequently be generated unnecessarily. The seventh exemplary embodiment of the present invention provides a buffer status report when the UE's buffer status has dramatically changed from the most recently reported buffer status, especially when an ENB may not estimate the change in the UE's buffer status (e.g., when the UE has provided incomplete information to the ENB due to the limit of the maximum value in the buffer status table). Therefore, UE's triggering a buffer status report whenever it transmits a predefined amount of data may cause generation of an excessively large number of buffer status reports.

In an exemplary method, a UE triggers a buffer status report when it has transmitted a predefined amount of data, based on the most recent buffer status report. For example, it prevents a BSR from frequently being unnecessarily generated by initializing a COUNTER that records the amount of transmitted data to zero (0) even when a buffer status report is triggered for other reasons (such as occurrence of high-priority data, occurrence of a padding BSR, and the like), instead of initializing the COUNTER to zero only when its count value COUNT exceeds a predefined reference value as in the manner of the related art. The transmission amount-based trigger may selectively apply the trigger depending on the buffer status value that is reported in the most recently transmitted buffer status report, since its utility is highest when the UE reports the amount of data, which has deviated from the range that it can indicate in the buffer status table. The transmission amount-based trigger may be applied, for example, only when the UE reports the highest value as a buffer status value, or when the UE reports a value greater than or equal to a predefined reference value as a buffer status value.

Figure 20:
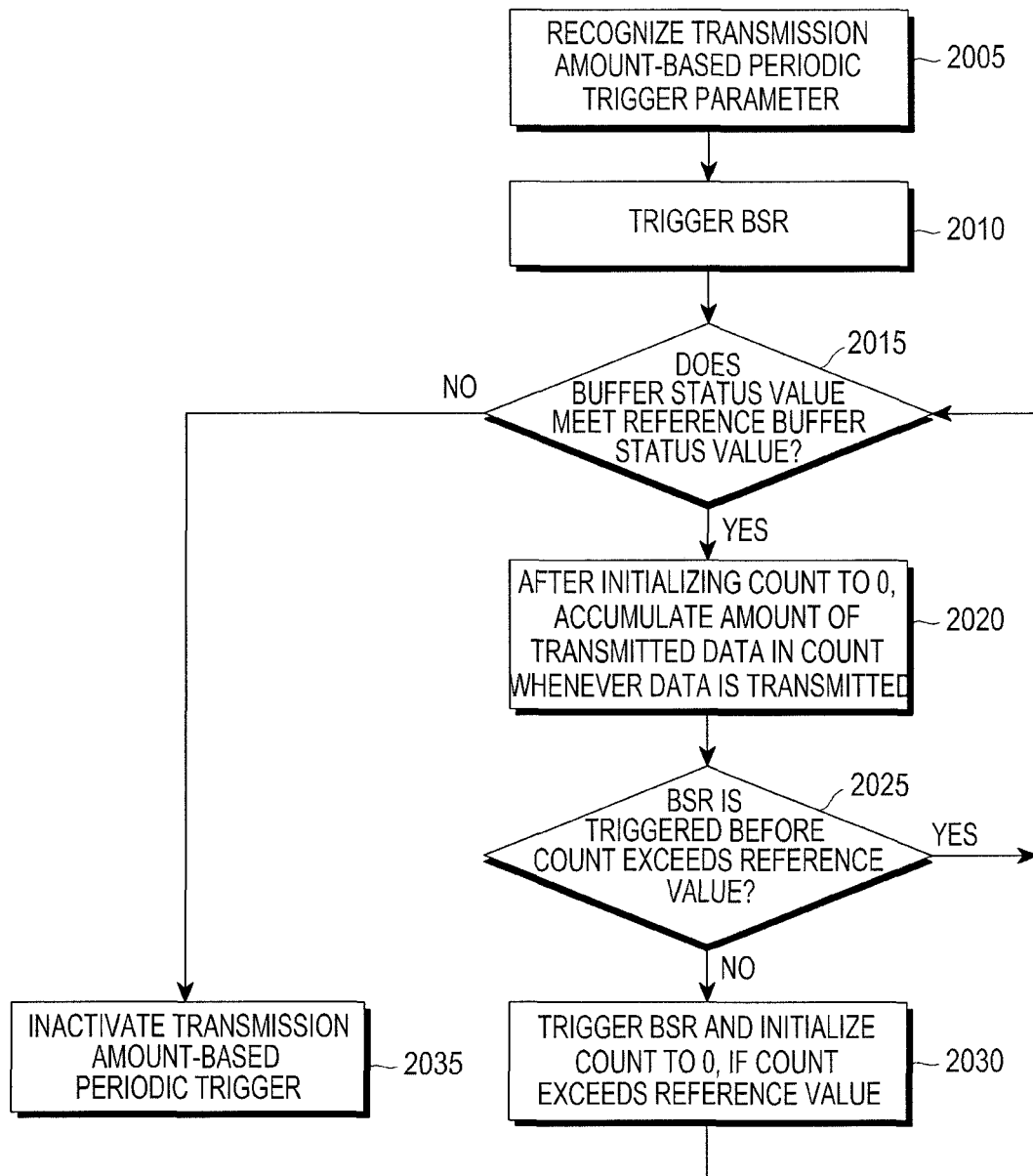
FIG. 20 illustrates an operation of a UE in a buffer status reporting method according to a seventh exemplary embodiment of the present invention.

FIG. 20 illustrates an operation of a UE in a buffer status reporting method according to a seventh exemplary embodiment of the present invention. In FIG. 20, a new trigger for a buffer status report is defined.

Referring to FIG. 20, the UE receives a notification of a parameter related to the transmission amount-based trigger from an ENB through a call setup process in step 2005. The parameter may include transmission amount criteria and a reference buffer status value(s). The reference buffer status value is a reference value for determining whether to apply the transmission amount-based trigger. The UE activates the transmission amount-based trigger if a buffer status report is triggered, which contains a buffer status value corresponding to the reference buffer status value. It is also possible to use a value agreed in advance between the UE and the ENB or define the highest value in the buffer status table as the reference buffer status value, instead of explicitly signaling the reference buffer status value.

In step 2010, the UE waits until a buffer status report is first triggered, and if the buffer status report is triggered, the UE determines in step 2015 whether a buffer status value included in the triggered buffer status report corresponds to the reference buffer status value. The reference buffer status value may be the maximum value defined in the buffer status table (e.g., a buffer status value of 63) or a value(s) that is notified in step 2005. If the buffer status value in the buffer status report corresponds to one of the reference buffer status values, the UE applies the transmission amount-based trigger in step 2020. If the buffer status value in the buffer status report does not correspond to any of the reference buffer status values, the UE inactivates the transmission amount-based trigger in step 2035. The phrase 'inactivating the transmission amount-based trigger' refers to not performing a series of operations associated with the transmission amount-based trigger, e.g., not performing an operation of managing by the UE the above-described COUNT. In step 2020, the UE initializes COUNT to 0. When data is transmitted in an uplink direction, the UE accumulates the amount of transmitted data in COUNT whenever data is transmitted.

In parallel with the count operation in FIG. 20, the UE determines in step 2025 whether a predefined BSR is triggered before COUNT exceeds the reference value. The predefined BSR may be, for example, all the remaining BSRs (i.e., regular BSRs, periodic BSRs and padding BSRs) except for truncated BSRs (see 3GPP TS 36.321) that carry incomplete information to the ENB due to the lack of padding space. The phrase 'a BSR corresponding to the predefined BSR is triggered before COUNT exceeds the reference value' means there is no need to trigger the transmission amount-based BSR because it means that the UE newly reports its buffer status to the ENB. In this case, the UE returns to step 2015 and resumes the operation of determining whether to activate the transmission amount-based trigger. For example, the UE performs subsequent operations, such as determining whether to apply the transmission amount-based trigger by determining the buffer status value in the newly triggered BSR. If the predefined BSR is not triggered until COUNT exceeds the reference value in step 2025, the UE triggers a periodic BSR and initializes COUNT to 0 at the time that COUNT exceeds the reference value, in step 2030, and returns to step 2015. The phrase 'triggering a periodic BSR' means that the UE does not transmit a scheduling request signal to transmit a BSR. For reference, if a regular BSR is triggered, the UE transmits a scheduling request signal to quickly transmit a BSR.

Whenever data is transmitted, COUNT increases by the amount of transmitted data. COUNT may also be adapted to increase only for the data belonging to a specific logical channel group. The specific logical channel group may be, for example, a logical channel group whose buffer status value in the most recently reported BSR is greater than or equal to a reference buffer status value.

In an exemplary method, the UE triggers a BSR if data of a predefined ratio is transmitted in the most recently reported buffer status.

Figure 21:
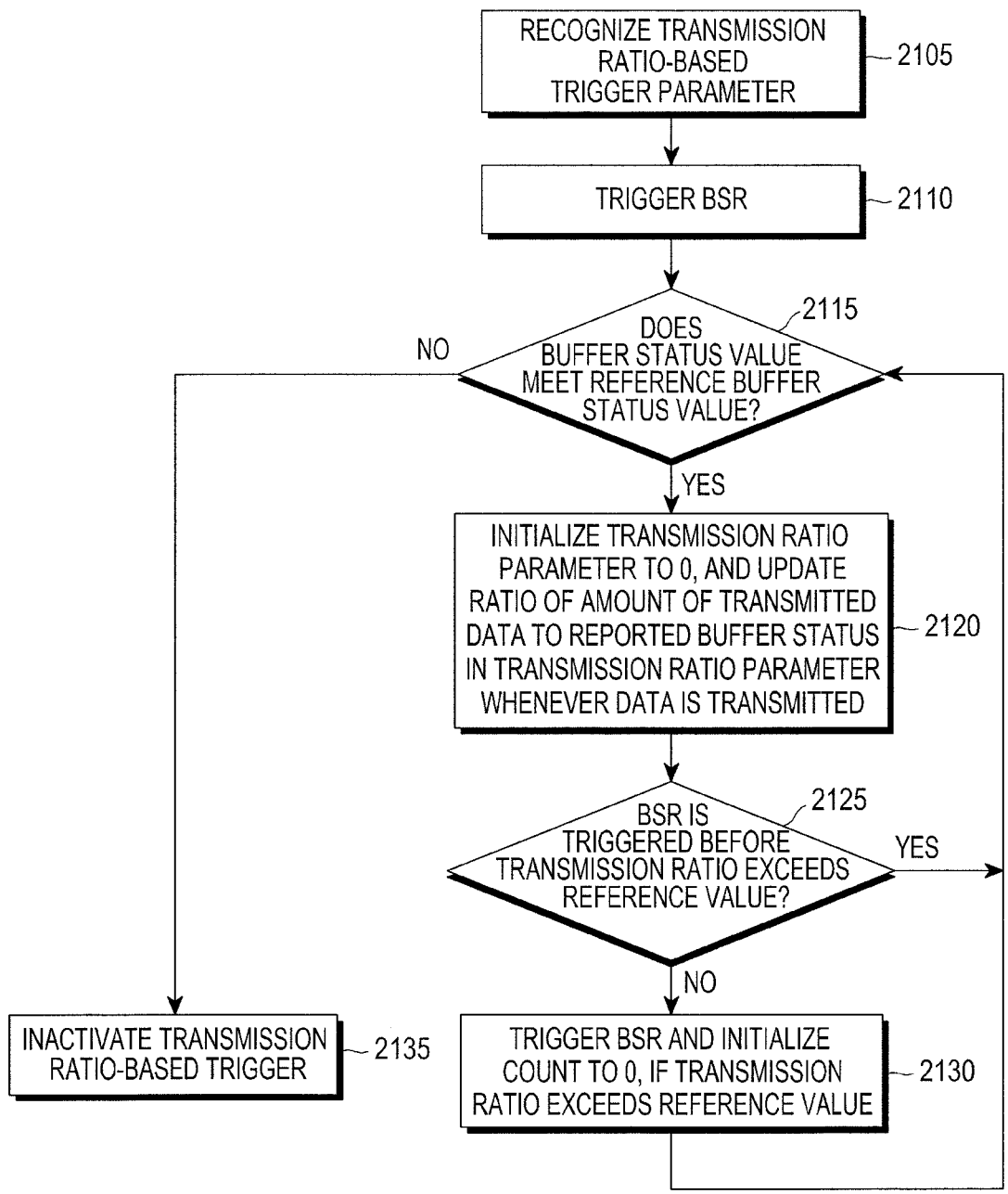
FIG. 21 illustrates an operation of a UE in the buffer status reporting method according to the seventh exemplary embodiment of the present invention.

FIG. 21 illustrates an operation of a UE in the buffer status reporting method according to the seventh exemplary embodiment of the present invention.

Referring to FIG. 21, the UE receives a notification of a parameter related to a transmission ratio-based trigger from an ENB through a call setup process in step 2105. The parameter includes a parameter (i.e., a transmission ratio criteria) for defining invocation conditions of the transmission ratio-based trigger, and a parameter (i.e., a reference buffer status value(s)) for defining application conditions of the transmission ratio-based trigger. A reference buffer size may be used in place of the parameter for defining application conditions of the transmission ratio-based trigger. The reference buffer status value may be a form of the above-described index. In some cases, it is more preferable to determine whether to apply the transmission ratio-based trigger, based on the sum of the amount of data, which is reported in the buffer status report. In this case, the reference buffer size is used, which indicates in bytes the data that is stored in the buffer. Similarly, even for the application conditions of the transmission amount-based trigger, the reference buffer size may be used, which indicates in bytes the data that is stored in the buffer.

In step 2110, the UE waits until a buffer status report is first triggered, and if the buffer status report is triggered, the UE determines in step 2115 whether the transmission ratio-based trigger is applied. In step 2115, the UE determines whether a buffer status value of the triggered buffer status report corresponds to one of the reference buffer status values, or whether the entire buffer status that can be derived from the buffer status value of the triggered buffer status report is greater than or equal to the reference buffer status value. The entire buffer status is a value that is obtained from buffer status values of the buffer status report by applying predefined rules. For example, when the UE reports a buffer status value of 10 (36<BS≤42) for a logical channel group 1 and a buffer status value of 20 (171<BS≤200) for a logical channel group 2 in the buffer status report, the entire buffer status may be defined as a sum of maximum or minimum values within the range indicated by each buffer status value, and in this example, it is 242 bytes (or 209 bytes). If the reference buffer status value is 1000 bytes, the transmission ratio-based trigger is not applied. If the reference buffer status value is 200 bytes, the transmission ratio-based trigger is applied. The process of determining in step 2115 whether the transmission ratio-based trigger is applied may also be applied to the process of determining in step 2015 whether the transmission amount-based trigger is applied.

If the UE needs to apply the transmission ratio-based trigger after determining in step 2115 whether the transmission ratio-based trigger is applied, the UE proceeds to step 2120. If the UE does not need to apply the transmission ratio-based trigger, the UE inactivates the transmission ratio-based trigger in step 2135. The inactivating of the transmission ratio-based trigger refers to not performing by the UE a series of operations related to the transmission ratio-based trigger, e.g., not performing operations, such as managing the transmission ratio parameters.

When the UE needs to apply the transmission ratio-based trigger, the UE initializes the transmission ratio parameter to 0 in step 2120. Whenever data is transmitted in the uplink direction, the UE stores a ratio of an accumulated value of the transmitted data to its comparison value in the transmission ratio parameter. The comparison value is a sum of the data that has been reported in the most recently triggered or transmitted buffer status report. In parallel with the operation, the UE determines in step 2125 whether a BSR is triggered before the transmission ratio parameter exceeds the reference value. The BSR may be, for example, all the remaining BSRs except for the truncated BSRs (see 36.321) that carry incomplete information to the ENB due to the lack of padding space. If the BSR is triggered before the transmission ratio parameter exceeds the reference value, the UE returns to step 2115 and determines again if the transmission ratio-based trigger is activated. If the BSR is not triggered until the transmission ratio parameter exceeds the reference value, the UE triggers a periodic BSR at the time the transmission ratio parameter exceeds the reference value, in step 2130, and returns to step 2115.

In an exemplary method, a BSR is always triggered if uplink data of a predefined size is transmitted. If a large amount of data is transmitted as described above, a need to trigger a new BSR increases due to a dramatic change in buffer status or, for example, an abrupt decrease in the buffer status value. More particularly, if a BSR is inserted in big data, overhead by the BSR may be relatively negligible because the BSR size is fixed.

Figure 22:
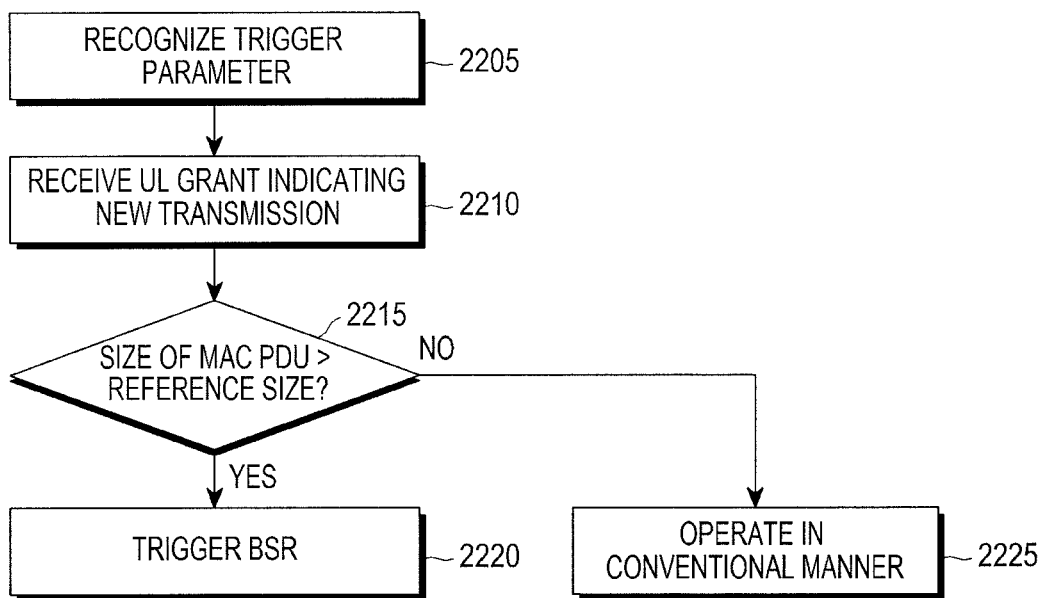
FIG. 22 illustrates an operation of a UE in the buffer status reporting method according to the seventh exemplary embodiment of the present invention.

FIG. 22 illustrates an operation of a UE in the buffer status reporting method according to the seventh exemplary embodiment of the present invention.

Referring to FIG. 22, the UE recognizes a trigger-related parameter in step 2205. The trigger-related parameter is information indicating the number of bytes of a MAC PDU, in which a BSR should be included during transmission of the MAC PDU. Upon receiving an uplink grant indicating new transmission from an ENB in step 2210, the UE determines in step 2215 the number of bytes (or size) of a MAC PDU to be transmitted, which is indicated by the uplink grant indicating new transmission. The UE compares the size of the MAC PDU to be transmitted, with the reference size recognized in step 2205, and if the size of the MAC PDU exceeds the reference size, the UE triggers a periodic BSR in step 2220. However, if the size of the MAC PDU is less than or equal to the reference size, the UE operates in a manner of the related art in step 2225.

Eighth Exemplary Embodiment

In this exemplary embodiment of the present invention, if required transmit power exceeds the UE's maximum transmit power, the UE reduces the transmit power to the maximum transmit power during its transmission. This is expressed as power scaling.

Occurring of the power scaling is strong circumstantial evidence that the ENB misconceives the UE's transmit power situation. Therefore, the UE needs to notify its transmit power situation to the ENB by transmitting a PHR. More particularly, when a plurality of uplink carriers are set for the UE, it may be unclear, transmit power situation of which uplink carrier the ENB has misconceived, which causes power scaling. As for transmission in a subframe in which power scaling has occurred, PHR transmission is highly likely to fail because its reliability may be undermined. Considering all of the above situations, the eighth exemplary embodiment of the present invention provides a method in which if it is expected that power scaling will occur in an arbitrary subframe, the UE triggers PHRs for all uplink carriers, data transmission on which is scheduled in the subframe, and triggers again a PHR after transmitting the PHRs, in order to improve the transmission reliability. In the following description, the phrase 'power scaling has occurred' is equivalent to the lack of transmit power.

Figure 23:
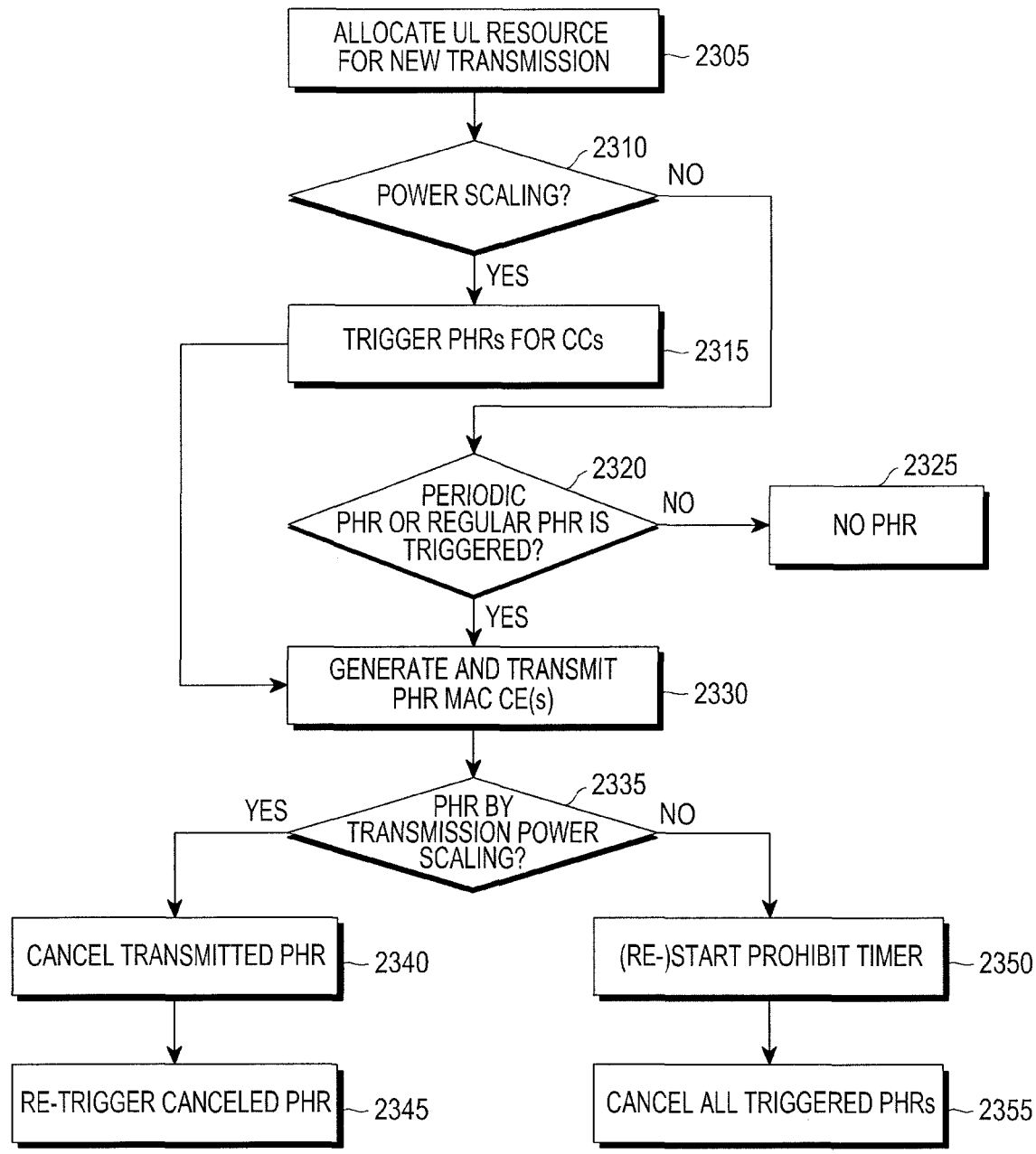
FIG. 23 illustrates an operation of a UE in a power headroom reporting method according to an eighth exemplary embodiment of the present invention.

FIG. 23 illustrates an operation of a UE in a power headroom reporting method according to an eighth exemplary embodiment of the present invention.

Referring to FIG. 23, if uplink transmission resources for new transmission are available in step 2305, the UE proceeds to step 2310. The uplink transmission resources may be for one uplink carrier or for several uplink carriers. In step 2310, the UE determines if power scaling has occurred during the uplink transmission. If the uplink transmission is achieved over a plurality of uplink carriers, e.g., if the uplink transmission resources, which are available in step 2305, carry X-byte data in an uplink carrier 1 and Y-byte data in an uplink carrier 2. Thereafter, power scaling may occur as a sum of required transmit powers for each uplink carrier and exceeds the UE's maximum transmit power even though required transmit power for individual uplink transmission of each uplink carrier does not exceed the UE's maximum transmit power.

If it is determined in step 2310 that the power scaling has occurred, the UE triggers in step 2315 a PHR for uplink carriers for which a PHR is configured, among the uplink carriers associated with uplink transmission during which the power scaling has occurred. For example, if an uplink carrier 1, an uplink carrier 2, and an uplink carrier 3 are set for the UE, and power scaling occurs as a PHR is configured for all the uplink carriers and uplink transmission is simultaneously performed in the uplink carrier 1 and the uplink carrier 2 in an arbitrary subframe, the UE triggers a PHR for the uplink carrier 1 and the uplink carrier 2 and proceeds to step 2330. However, if it is determined in step 2310 that power scaling has not occurred, the UE determines in step 2320 whether a periodic PHR or a regular PHR has occurred. Description of the periodic PHR and the regular PHR are disclosed in Section 5.4.6 of 3GPP TS 36.321, so description thereof will be omitted. If no periodic PHR or no regular PHR has been triggered in step 2320, the UE ends the process without generating the PHR in step 2325. If a periodic PHR or a regular PHR has been triggered in step 2320, the UE generates and transmits a PHR for an uplink carrier for which a PHR is triggered, in step 2330. Since the PHR transmission may be achieved, for example, only through its associated uplink carrier, the triggered PHRs may be transmitted at different timings.

After transmitting the PHR in step 2330, the UE determines in step 2335 whether the transmitted PHR is a PHR which is triggered by power scaling. If so, the UE proceeds to step 2340, and if the transmitted PHR is a PHR that has been triggered for other reasons rather than power scaling, the UE proceeds to step 2350. In step 2340, the UE cancels completely transmitted PHR. In step 2345, the UE re-triggers the cancelled PHRs so that they may be transmitted once again at next transmission occasion. This is because transmission failure is highly likely to occur since the PHRs were transmitted with scaled power.

If it is determined in step 2335 that the transmitted PHR is a PHR that has been triggered for other reasons rather than power scaling, the UE drives a prohibit timer in step 2350 and cancels all triggered PHRs in step 2355. The prohibit timer, which is for preventing a PHR from being excessively frequently transmitted, is driven whenever a PHR is transmitted, and the UE does not trigger a periodic PHR or a regular PHR while the prohibit timer is driven. For reference, for the PHR generated by power scaling, the UE does not perform an operation of driving the prohibit timer after the PHR is transmitted. This is to drive the PHR by power scaling, which has a different priority from that of the PHR of the related art, independently of the prohibit timer, since the main purpose of the prohibit timer is to prevent the periodic PHRs of the related art or regular PHRs from being frequently generated.

Ninth Exemplary Embodiment

When a plurality of carriers are set for a UE, the UE activates only some of the carriers and inactivates the other carriers in order to reduce the power consumption. The carrier activation and inactivation is controlled by a MAC layer control message that an ENB transmits. The MAC layer control message includes a predefined bitmap which indicates states of the remaining carriers except for the primary carrier. One of the carriers is designated as a primary carrier, and the primary carrier is featured by always being activated. If needed, an ENB may change the primary carrier of the UE.

A mapping relationship between bits of the bitmap and carriers may be set, for example, in a control message for setting carriers. For example, assuming that a carrier 1, a carrier 2, and a carrier 3 are set for a UE, and the carrier 1 is a primary carrier, the ENB may inform the UE in the control message for setting the carrier 2 and the carrier 3, to which bit (e.g., a first bit) of the bitmap the carrier 2 corresponds and to which bit (e.g., a second bit) of the bitmap the carrier 3 corresponds.

When the UE's primary carrier is changed, the ENB should indicate to which bit of the bitmap the previous primary carrier corresponds. Assuming that a set of carriers which are set for a UE is called a carrier set, when the primary carrier is changed, both the previous primary carrier and the new primary carrier may belong to the carrier set, or one of them may belong to the carrier set. Given that the primary carrier change is likely to be performed commonly in terms of load balancing, the primary carrier change of the first type is expected to occur more frequently.

As for the primary carrier change of the first type, bit positions that have been used by a new primary carrier are available, since the previous primary carrier and the new primary carrier are both the carriers which are already set. In other words, in the primary carrier change procedure of this type, bit positions of the new primary carrier may be used as bit positions of the previous primary carrier. For example, assuming that a primary carrier is changed from a carrier 1 to a carrier 2, if there is a bit position which is already allocated for the carrier 2, the UE uses the bit position that the carrier 2 has used, as a bit position of the carrier 1.

Figure 24:
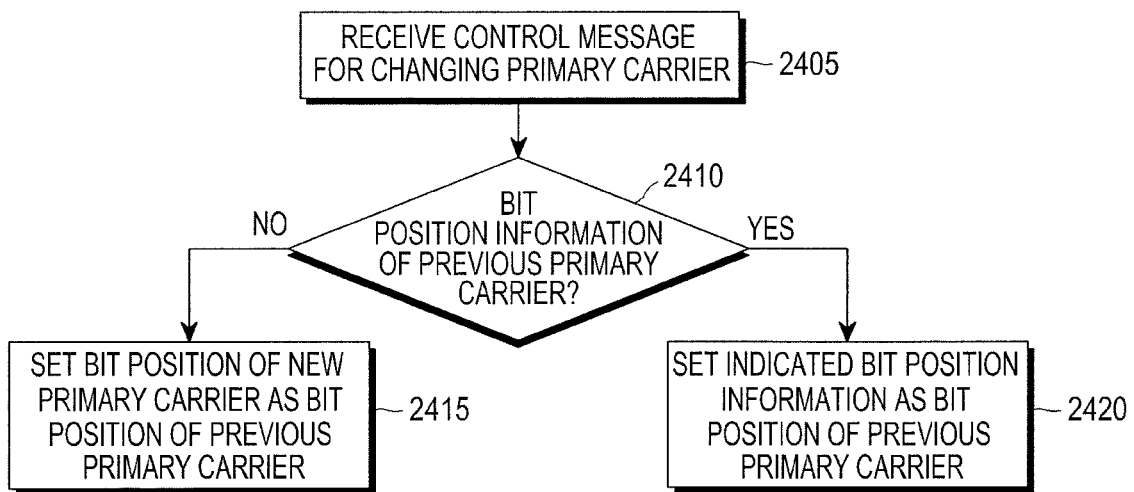
FIG. 24 illustrates a method of changing a primary carrier according to a ninth exemplary embodiment of the present invention.

FIG. 24 illustrates a method of changing a primary carrier according to a ninth exemplary embodiment of the present invention.

Referring to FIG. 24, a UE receives a control message for changing a primary carrier from an ENB in step 2405. For reference, the terms 'carrier' and 'cell' are often used interchangeably with respect to carrier aggregation in 3GPP specification, though they are different in concepts. In this exemplary embodiment of the present invention, the terms 'carrier' and 'cell' will be understood in the same context unless otherwise noted. The UE changes the primary carrier in accordance with the indication of the primary carrier change message. In step 2410, the UE determines if information about bit positions of the previous primary carrier exists in the control message. If it is determined in step 2410 that the bit position information exists, the UE sets the indicated bit position to correspond to the previous primary carrier in step 2420. The information about the bit position is information indicating to which bit of the bitmap the carrier corresponds. In contrast, if it is determined in step 2410 that information about bit positions of the previous primary carrier does not exist in the control message, the UE determines a bit position of the carrier which has become a new primary carrier, from the control message, and sets the determined bit position of the carrier as a bit position of the previous primary carrier, in step 2415.

Tenth Exemplary Embodiment

Figure 25:
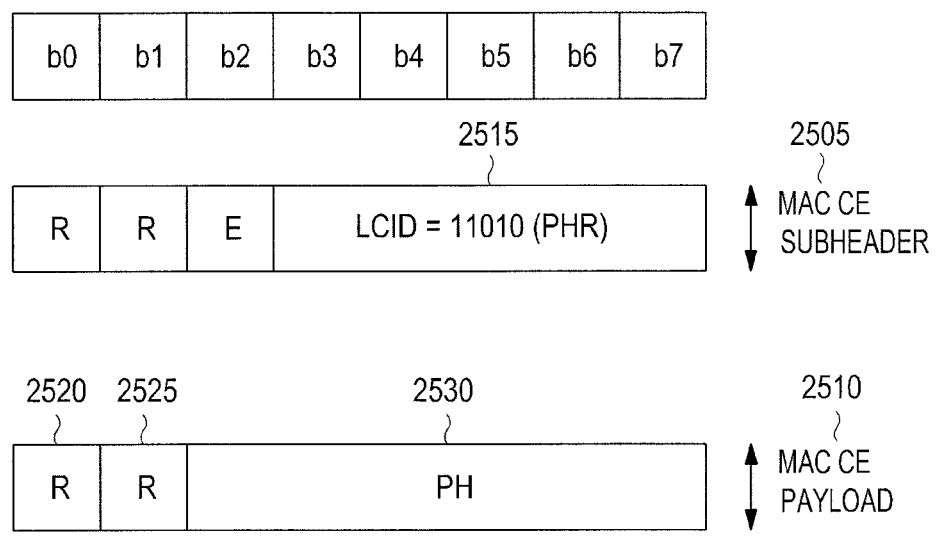
FIGS. 25 through 27 illustrate a power headroom reporting method according to a tenth exemplary embodiment of the present invention.
Figure 26:
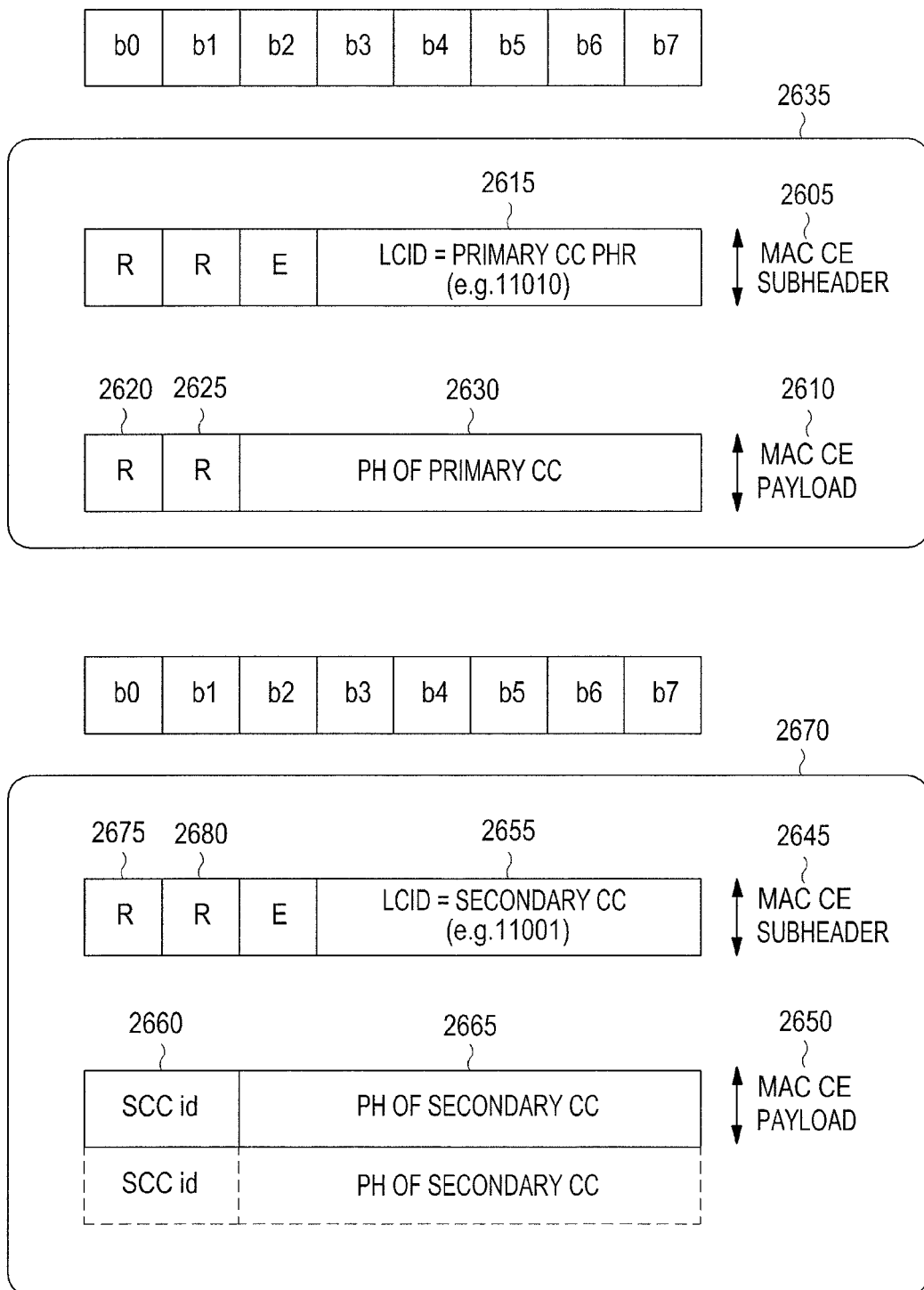
Figure 27:
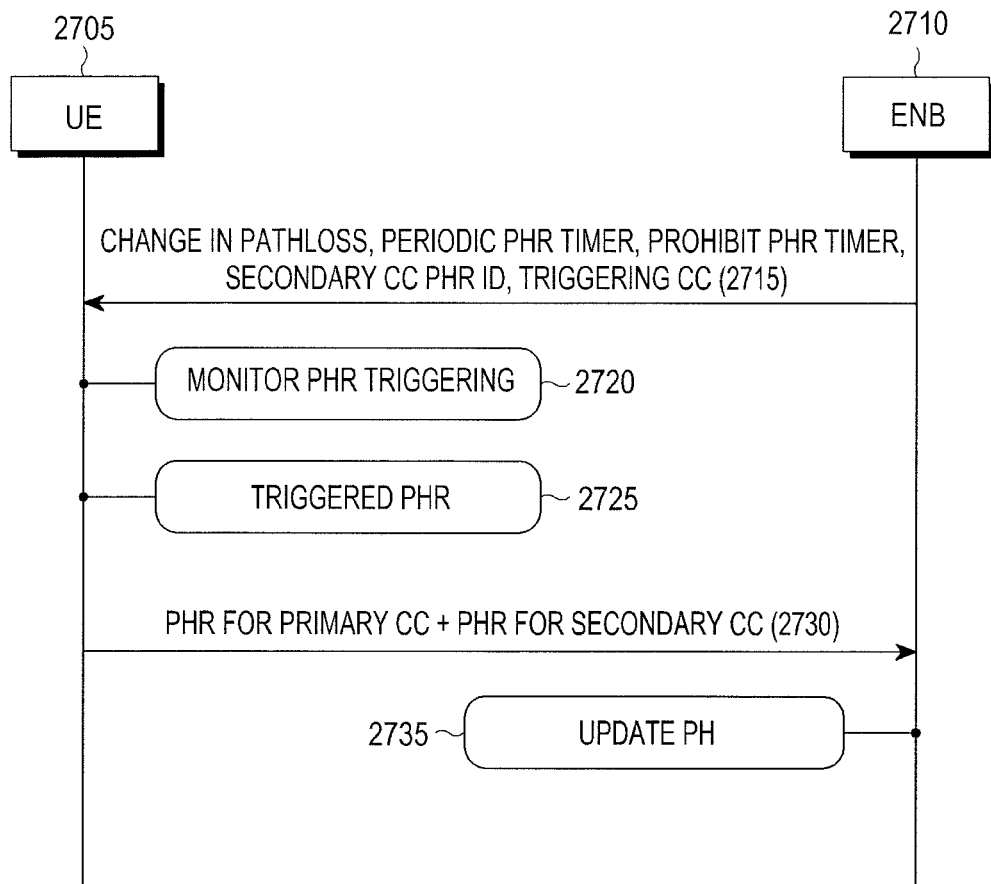

FIGS. 25 through 27 illustrate a power headroom reporting method according to a tenth exemplary embodiment of the present invention. The tenth exemplary embodiment provides a procedure in which a UE handles a PHR for a plurality of carriers related to carrier aggregation.

If a plurality of uplink carriers are aggregated for one UE and a PHR function is set for each carrier, one UE should determine if a PHR has occurred for the plurality of carriers. As described above, whether a PHR has occurred or not may be determined by a periodic timer and a change in pathloss. In terms of transferring a PHR to an ENB in a timely manner, a UE sets the periodic timer and a reference value of the pathloss independently for each uplink carrier.

However, when frequency bands are considered, to which a carrier aggregation operation is presently expected to be applied, a difference in pathloss between uplink carriers may not be so significant. Therefore, the UE's operation may be simplified by determining whether a PHR is triggered, only for selected one uplink carrier among a plurality of uplink carriers, and if a PHR is triggered for the selected uplink carrier, simultaneously triggering PHRs for all uplink carriers for which a PHR is set.

When the UE simultaneously transmits the triggered PHRs, PHR triggering, PHR generation, and PHR transmission are managed in batches for all uplink carriers, contributing to a dramatic reduction in complexity of the UE. To this end, there is a need to indicate an uplink carrier, to a PHR for which an arbitrary PHR corresponds.

For example, currently, there are two unused bits in a PHR, and the two bits may be used to indicate an uplink carrier associated with the PHR. In this case, since the number of uplink carriers which can be aggregated for a UE is five in maximum, the two bits are insufficient to indicate an uplink carrier, to a PHR for which each PHR corresponds.

In order to address this problem, an exemplary embodiment of the present invention classifies PHRs into PHRs for a primary carrier and PHRs for a secondary carrier. For example, in the LTE system, given that the carriers that a UE can use in carrier aggregation include one primary carrier and a maximum of four secondary carriers, if a PHR for a secondary carrier is newly defined, two unused bits of the PHR for a secondary carrier may be used to indicate to which secondary carrier a PHR for an arbitrary secondary carrier corresponds.

Referring to FIG. 25, the PHR includes a MAC subheader 2505 and a payload 2510 as a form of MAC CEs. In a logical channel identifier field 2515 of the MAC subheader is inserted information indicating that the MAC CE is a PHR, the first two bits 2520 and 2525 of the payload 2510 are not used, and in 6 bits 2530 of the payload is inserted a Power Headroom (PH).

Referring to FIG. 26, a logical channel identifier indicating a PHR 2635 for a primary carrier and a logical channel identifier indicating a PHR 2670 for a secondary carrier are defined, and an appropriate logical channel identifier is inserted in a logical channel identifier field of a MAC subheader 2645 so that the PHR 2635 for a primary carrier may be distinguished from the PHR 2670 for a secondary carrier.

Given that in the related art, only one carrier exists as an uplink carrier used by a UE and the one carrier has the same properties as the primary carrier, it is possible to reuse the logical channel identifier that was defined as a logical channel identifier for a PHR in a manner of the related art, instead of separately defining a logical channel identifier of the PHR for a primary carrier. In other words, for example, "11010", which is defined as a logical channel identifier of a PHR in the current specification, is used as a logical channel identifier for a primary carrier (see 2615), and a logical channel identifier (e.g., "11001"), which is not used in the current specification, may be used as a logical channel identifier for a secondary carrier (see 2655).

The first two bits 2620 of a payload 2610 of the PHR 2635 for a primary carrier are not used, and in the remaining six bits 2630 of the payload is inserted a PH of a primary carrier.

As described above in the fourth exemplary embodiment of the present invention, the payload 2610 of the PHR 2635 for a primary carrier has two bytes. In the first byte 2620 of the payload 2610 may be inserted a PH for a PUSCH of a primary carrier, and in a second byte 2625 may be inserted a PH for a PUCCH. In the first two bits 2660 of the payload 2650 of the PHR 2670 for a secondary carrier is inserted information indicating to which secondary carrier the PHR corresponds, and in the remaining sixth bits 2665 of the payload is written the PH for a secondary carrier.

In the PHR 2670 for a secondary carrier may be inserted PHs of a plurality of secondary carriers. For example, an identifier 2660 of a secondary carrier and PHs 2665 for secondary carriers may be inserted, for each byte of the payload 2650 of the PHR 2670 for a secondary carrier. Since a size of the payload 2650 of the PHR 2670 for a secondary carrier varies depending on the number of the inserted PHs for secondary carriers, there is a need to explicitly indicate the size of the PHR 2670 for a secondary carrier. As for a size of the PHR 2670 for a secondary carrier, it is possible to indicate the size using, for example, two unused bits 2675 and 2680 of the MAC subheader 2645.

Referring to FIG. 27, when a UE 2705 and an ENB 2710 are considered, for which one primary carrier and a plurality of secondary carriers are aggregated, the ENB 2710 transfers PHR configuration information to the UE 2705 using a predefined control message in step 2715. The PHR configuration information includes at least one of a pathloss change 'dl-pathlossChange', a periodic PHR timer 'periodicPHR-timer', a prohibit PHR timer 'prohibitPHR-timer', a carrier component 'CC' where it is to be determined whether a PHR is triggered, and an identifier 2660 of a secondary carrier to be used in the PHR 2670 for a secondary carrier (hereinafter, referred to as a secondary carrier identifier for a PHR). The prohibit PHR timer 'prohibitPHR-timer' is for prohibiting a PHR from being excessively frequently generated, and it is driven if the PHR is transmitted. No PHR is triggered while the prohibit PHR timer is driven. The CC where it is to be determined whether a PHR is triggered is a CC (hereinafter referred to as a triggering CC) that a UE uses when determining whether a PHR is triggered, based on the pathloss change. The triggering CC where it is to be determined whether a PHR is triggered is a downlink CC, and the triggering CC may be directly indicated by an ENB, or may be determined depending on a scheme agreed in advance between the UE and the ENB. For example, whether a PHR is triggered may be determined using a primary CC. As for the identifier 2660 of a secondary carrier, a total of four identifiers of, for example, 0 to 3 are defined, and they may be directly indicated for each secondary carrier, or may be derived from other information. For example, if an identifier for another purpose is allocated for each carrier, secondary carrier identifiers for a PHR may be allocated in a predefined manner in order of the size of the allocated identifiers. Otherwise, the secondary carrier identifiers for a PHR may be allocated in order of the center frequency of carriers, or in order of the high frequency to the low frequency, or vice versa.

Upon receiving the PHR configuration information from the ENB in step 2715, the UE determines in step 2720 whether a PHR is triggered, based on the PHR configuration information. Whether a PHR is triggered or not is determined depending on whether a pathloss change of a downlink carrier, where it is to be determined whether a PHR is triggered, exceeds a predefined reference value, or depending on whether a periodic timer has expired.

If a PHR is triggered at an arbitrary timing in step 2725, the UE transmits a PHR in a MAC PDU that is transmitted at the earliest timing, in step 2730. The PHR includes a PHR for a primary carrier and a PHR for a secondary carrier. The number of PHRs for a secondary carrier may be one or plural. If PHs for all secondary carriers are inserted in a PHR for one secondary carrier, information indicating the size of a PHR for a secondary carrier is also inserted together in the MAC subheader of the PHR for a secondary carrier.

Thereafter, upon receiving the PHR that the UE transmitted in step 2730, the ENB updates in step 2735 a PH for each carrier of the UE based on the value reported in step 2730, and refers to it during the future uplink scheduling.

In the tenth exemplary embodiment of the present invention, the term 'carrier' may be often construed to have the same meaning as the term 'cell'. Thus, the primary carrier may be construed to be a primary cell, and the secondary carrier may be construed to be a secondary cell.

Figure 29:
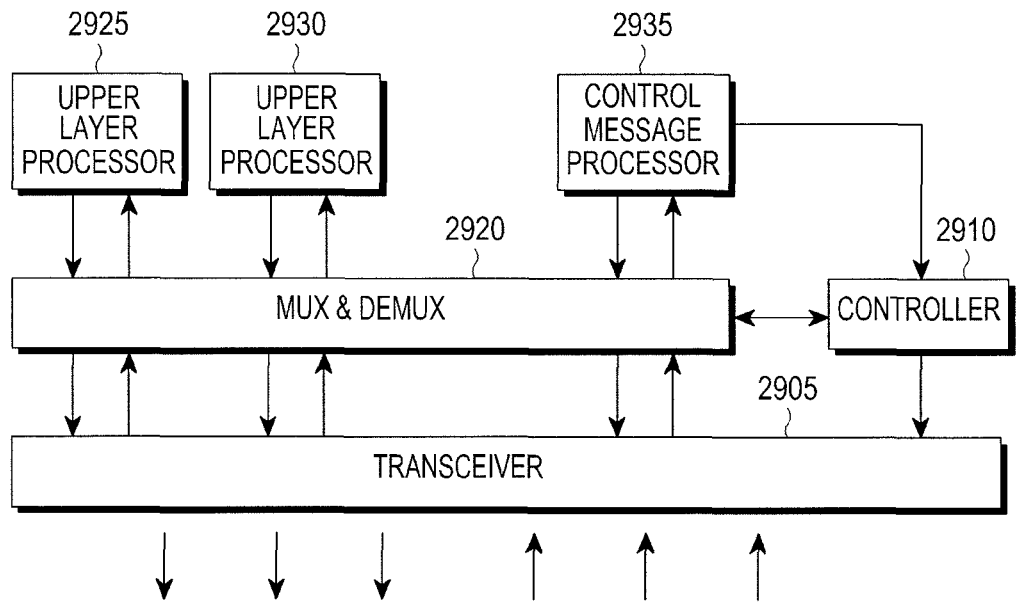
FIG. 29 illustrates a structure of a UE according to an exemplary embodiment of the present invention.

FIG. 29 illustrates a structure of a UE according to an exemplary embodiment of the present invention.

Referring to FIG. 29, the UE may include a transceiver 2905, a controller 2910, a multiplexer/demultiplexer 2920, a control message processor 2935, and various upper layer processors 2925 and 2930.

The transceiver 2905 receives data and a predefined control signal on a downlink carrier, and transmits data and a predefined control signal on an uplink carrier. When a plurality of carriers are set, the transceiver 2905 performs data transmission/reception and control signal transmission/reception on the plurality of carriers.

The multiplexer/demultiplexer 2920 multiplexes the data that is generated in the upper layer processors 2925 and 2930 or the control message processor 2935. The multiplexer/demultiplexer 2920 demultiplexes the data received from the transceiver 2905, and transfers it to the proper upper layer processors 2925 and 2930 or the control message processor 2935. The multiplexer/demultiplexer 2920 may also multiplex a control message (e.g., a BSR or a PHR) received from the controller 2910, to a MAC PDU.

The control message processor 2935 performs an operation by processing a control message transmitted by the network. The control message processor 2935 transfers carrier-related information inserted in the control message to the controller 2910. The upper layer processors 2925 and 2930 may be configured individually for each service. The upper layer processors 2925 and 2930 may process data generated in a user service, such as a File Transfer Protocol (FTP) and a VoIP, and transfer it to the multiplexer/demultiplexer 2920. The upper layer processors 2925 and 2930 may process the data received from the multiplexer/demultiplexer 2920 and transfer it to a service application of an upper layer.

The controller 2910 analyzes a scheduling command (e.g., an uplink grant) received through the transceiver 2905, and controls the transceiver 2905 and the multiplexer/demultiplexer 2920 such that uplink transmission may be performed on appropriate transmission resources at appropriate timing. The controller 2910 generates scheduling information, such as a BSR and a PHR at appropriate timing, and transfers it to the multiplexer/demultiplexer 2920. In other words, the controller 2910 performs BSR in accordance with a predefined exemplary method among the methods described in the first through third exemplary embodiments and the seventh exemplary embodiment. In other words, if BSR generation conditions are met, the controller 2910 determines which buffer status table it will use in generating a BSR, and if a plurality of uplink grants are received for the same subframe, the controller 2910 determines at which timing it will enter a logical channel prioritization process, and determines the time it will determine the BSR format and a buffer status value of the BSR. The controller 2910 performs PHR in accordance with a predefined exemplary method among the methods described in the fourth through sixth exemplary embodiments and the eighth and tenth exemplary embodiments. In other words, the controller 2910 determines whether power headroom information for a PUSCH is triggered, for each uplink carrier. In generating a PHR MAC CE for an arbitrary uplink carrier, the controller 2910 determines whether it will insert even the power headroom information for a PUCCH together. The controller 2910 determines whether a PHR function for an arbitrary uplink carrier is activated. Upon receiving an uplink grant for uplink transmission, the controller 2910 determines whether it will re-start PHR timers of the uplink carriers for which a PHR function is set. In accordance with the primary carrier change method described in the ninth exemplary embodiment, the controller 2910 may set a bit position of the new or previous primary carrier depending on a primary carrier change control message received from an ENB.

Figure 30:
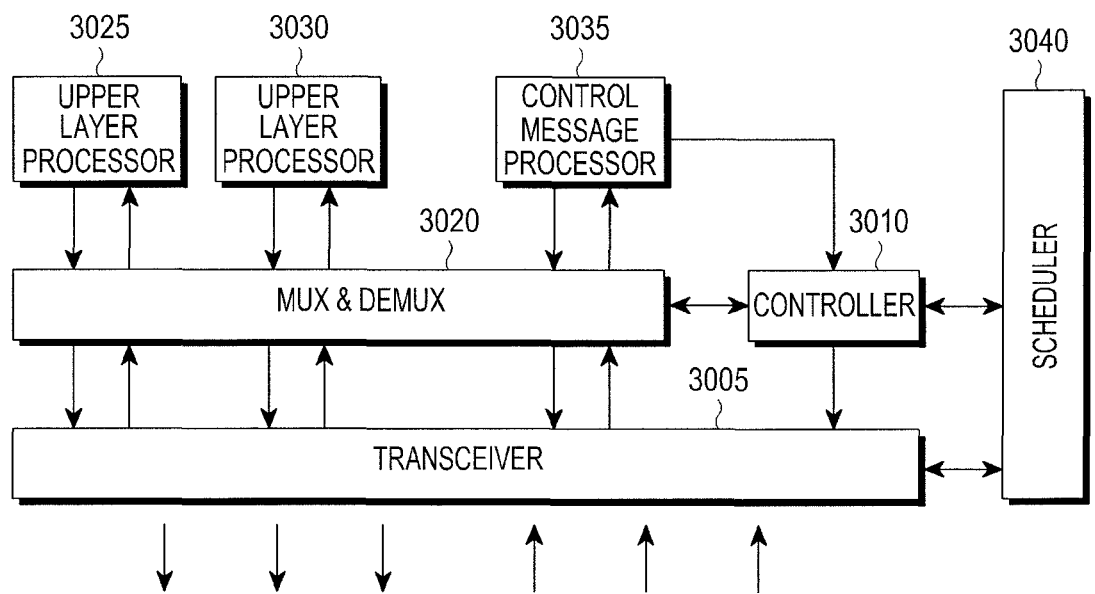
FIG. 30 illustrates a structure of an ENB according to an exemplary embodiment of the present invention.

FIG. 30 illustrates a structure of an ENB according to an exemplary embodiment of the present invention.

Referring to FIG. 30, the ENB may include a transceiver 3005, a controller 3010, a multiplexer/demultiplexer 3020, a control message processor 3035, various upper layer processors 3025 and 3030, and a scheduler 3040.

The transceiver 3005 receives data and a predefined control signal on an uplink carrier, and transmits data and a predefined control signal on a downlink carrier. When a plurality of carriers are set, the transceiver 3005 performs data transmission/reception and control signal transmission/reception on the plurality of carriers.

The multiplexer/demultiplexer 3020 multiplexes the data generated in the upper layer processors 3025 and 3030 or the control message processor 3035. The multiplexer/demultiplexer 3020 demultiplexes the data received from the transceiver 3005, and transfers it to the appropriate upper layer processors 3025 and 3030 or the control message processor 3035. In addition, the multiplexer/demultiplexer 3020 demultiplexes from a MAC PDU a control message (e.g., a BSR and a PHR) received from the controller 3010, and transfers it to the controller 3010.

The control message processor 3035 generates a predefined control message and sends it to the multiplexer/demultiplexer 3020. The control message processor 3035 processes a control message received from the multiplexer/demultiplexer 3020. The control message processor 3035 may generate, for example, a control message for additionally setting a carrier for an arbitrary UE, and send it to the multiplexer/demultiplexer 3020. For example, the upper layer processors 3025 and 3030 may be configured individually for each service for a specific UE. The upper layer processors 3025 and 3030 process the data generated in a user service, such as an FTP and a VoIP, and transfer it to the multiplexer/demultiplexer 3020. The upper layer processors 3025 and 3030 process the data received from the multiplexer/demultiplexer 3020 and transfer it to a service application of an upper layer.

The controller 3010 analyzes scheduling information, such as a BSR and a PHR, and notifies the scheduler 3040 of a buffer status or a power headroom of the UE. The controller 3010 performs BSR in accordance with a predefined exemplary method among the methods described in the first through third exemplary embodiments and the seventh exemplary embodiment. In other words, the controller 3010 determines a buffer status table based on which a received BSR is configured, to thereby recognize from the BSR the amount of transmittable data stored in the UE and the logical channel group in which transmittable data is stored, and provides this information to the scheduler 3040.

The controller 3010 performs PHR in accordance with a predefined exemplary method among the methods described in the fourth through sixth exemplary embodiments and the eighth and tenth exemplary embodiments. The controller 3010 derives power headroom information from the received PHR, and provides it to the scheduler 3040. The multiplexer/demultiplexer 3020 determines a subheader of the MAC PDU received from the transceiver 3005, and transfers it to the appropriate upper layer processors 3025 and 3030. If a BSR or a PHR is inserted in the MAC PDU, the multiplexer/demultiplexer 3020 transfers the inserted information to the controller 3010. Upon receiving a MAC PDU containing a PHR for a PCC, the multiplexer/demultiplexer 3020 demultiplexes from a payload part a PHR MAC CE containing both power headroom information for a PUSCH and power headroom information for a PUCCH, and transfers it to the controller 3010. The scheduler 3040 allocates transmission resources for each UE taking into account the buffer status and channel condition of the UE, and determines the transmission format. In accordance with the primary carrier change method described in the ninth exemplary embodiment, the controller 3010 may transmit a primary carrier change control message to a UE to allow the UE to set a bit position of the new or previous primary carrier.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing uplink transmission by a terminal in a wireless communication system, the method comprising:
   grouping a plurality of uplink carriers into a transmission timing group sharing a timing advance based on a control message received from a base station;
   determining a reference downlink carrier for the transmission timing group including the plurality of uplink carriers;
   determining uplink transmission timing which is common to the plurality of uplink carriers in the transmission timing group, by adjusting a frame boundary of each of the plurality of uplink carriers based on a frame boundary of the reference downlink carrier and the timing advance; and
   performing uplink transmission on the plurality of uplink carriers based on the determined uplink transmission timing.

2. The method of claim 1, wherein the reference downlink carrier is assigned by the base station.

3. The method of claim 1, wherein the control message comprises a radio resource control (RRC) message.

4. The method of claim 1, wherein uplink grants for the plurality of uplink carriers are transmitted through at least one downlink carrier of a plurality of downlink carriers, and the at least one downlink carrier is indicated by the base station.

5. The method of claim 1,
   further comprising, if a media access control (MAC) protocol data unit (PDU) contains a regular buffer status report (BSR) or a periodic BSR and the MAC PDU has sufficient padding space to insert a padding BSR, determining that the padding BSR is omitted from the MAC PDU.

6. A terminal for performing uplink transmission in a wireless communication system, the terminal comprising:
a transceiver configured to communicate with a base station; and
a processor coupled with the transceiver and configured to:
group a plurality of uplink carriers into a transmission timing group sharing a timing advance based on a control message received from the base station,
determine a reference downlink carrier for the transmission timing group including the plurality of uplink carriers,
determine uplink transmission timing which is common to the plurality of uplink carriers in the transmission timing group, by adjusting a frame boundary of each of the plurality of uplink carriers based on a frame boundary of the reference downlink carrier and the timing advance, and
perform uplink transmission on the plurality of uplink carriers based on the determined uplink transmission timing.

7. The terminal of claim 6, wherein the reference downlink carrier is assigned by the base station.

8. The terminal of claim 6, wherein the control message comprises a radio resource control (RRC) message.

9. The terminal of claim 6,
wherein the processor is further configured to receive uplink grants for the plurality of uplink carriers that are transmitted through at least one downlink carrier of a plurality of downlink carriers, and
wherein the at least one downlink carrier is indicated by the base station.

10. The terminal of claim 6, wherein the processor is further configured to, if a media access control (MAC) protocol data unit (PDU) contains a regular buffer status report (BSR) or a periodic BSR and the MAC PDU has a sufficient padding space to insert a padding BSR, determine that the padding BSR is omitted from the MAC PDU.

11. A method for scheduling uplink transmission by a base station in a wireless communication system, the method comprising:
transmitting, to a terminal, a control message comprising information for grouping a plurality of uplink carriers into a transmission timing group sharing a timing advance; and
receiving, from the terminal, uplink transmission on the plurality of uplink carriers based on uplink transmission timing which is common to the plurality of uplink carriers in the transmission timing group,
wherein a reference downlink carrier is determined for the transmission timing group including the plurality of uplink carriers, and
wherein a frame boundary of each of the plurality of uplink carriers in the transmission timing group is adjusted based on a frame boundary of the reference downlink carrier and the timing advance.

12. The method of claim 11, further comprising assigning the reference downlink carrier to the terminal.

13. The method of claim 11, wherein the control message comprises a radio resource control (RRC) message.

14. The method of claim 11, wherein uplink grants for the plurality of uplink carriers are transmitted through at least one downlink carrier of a plurality of downlink carriers, and the at least one downlink carrier is indicated by the base station.

15. A base station for scheduling uplink transmission in a wireless communication system, the base station comprising:
a transceiver configured to communicate with a terminal; and
a processor coupled with the transceiver and configured to:
transmit, to the terminal, a control message comprising information for grouping a plurality of uplink carriers into a transmission timing group sharing a timing advance, and
receive, from the terminal, uplink transmission on the plurality of uplink carriers, based on uplink transmission timing which is common to the plurality of uplink carriers in the transmission timing group,
wherein a reference downlink carrier is determined for the transmission timing group including the plurality of uplink carriers, and
wherein a frame boundary of each of the plurality of uplink carriers in the transmission timing group is adjusted based on a frame boundary of the reference downlink carrier and the timing advance.

16. The base station of claim 15, wherein the processor is further configured to assign the reference downlink carrier to the terminal.

17. The base station of claim 15, wherein the control message comprises a radio resource control (RRC) message.

18. The base station of claim 15, wherein uplink grants for the plurality of uplink carriers are transmitted through at least one downlink carrier, and the at least one downlink carrier is indicated by the base station.

* * * * *